(12) United States Patent
Okuda et al.

(10) Patent No.: US 6,267,515 B1
(45) Date of Patent: Jul. 31, 2001

(54) OPTICAL COUPLING MODULE AND MANUFACTURING METHOD OF THE SAME

(75) Inventors: Keiji Okuda; Yoichiro Katsuki, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/224,885

(22) Filed: Dec. 31, 1998

(30) Foreign Application Priority Data

Feb. 27, 1998 (JP) .................................................. 10-064266
May 12, 1998 (JP) .................................................. 10-146633

(51) Int. Cl.⁷ ..................................................... G02B 6/36
(52) U.S. Cl. ............................................... 385/88; 356/89
(58) Field of Search ................................. 385/88, 89, 92, 385/130, 131, 31, 39, 47, 49, 50, 52

(56) References Cited

U.S. PATENT DOCUMENTS 4,871,224 * 10/1989 Karstensen et al. .............. 350/96.15
5,479,540 * 12/1995 Boudreau et al. ..................... 385/14
5,577,142 * 11/1996 Muller-Fiedler et al. ............. 385/47

* cited by examiner

*Primary Examiner*—Frank G. Font
*Assistant Examiner*—Michael P. Stafira
(74) *Attorney, Agent, or Firm*—Venable; Robert J. Frank; Allen Wood

(57) ABSTRACT

An optical coupling module suitable for use as an optical-communication terminal station, which facilitates alignment and helps to reduce production cost. The module comprises a semiconductor substrate 14 having a mirror-finished surface 14a and having mounted on this mirror-finished surface an optical functional element 11 with an optical functional surface 11a kept substantially parallel with the mirror-finished surface 14a and with a reverse surface, opposite the optical functional surface 11a, facing the mirror-finished surface 14a; and an optical device 15, supported on the mirror-finished surface 14a of the semiconductor substrate in such a way that the optical device is optically coupled to the optical functional element 11.

32 Claims, 20 Drawing Sheets

OPTICAL COUPLING MODULE AND MANUFACTURING METHOD OF THE SAME

BACKGROUND OF THE INVENTION

1. Field of the Invention

The present invention relates to an optical coupling module suitable for use in terminal stations in optical telecommunications and also to a method of manufacturing the same.

2. Related Art

Recently, a project called "Fiber to the Home" has been in progress, which is extending optical fibers up to individual homes for optical communications with a large traffic capacity.

Under this project, multiplexed light having component beams of wavelength bands of 1.3 $\mu$m and 1.55 $\mu$m, for example, is sent to communication terminals of individual homes.

As optical elements in optical devices at terminal stations to receive multiplexed light such as mentioned above, it has been proposed to use CGH (Computer Generated Hologram) elements as described in the specification of Japanese Patent Application No. 9-147115 (referring to U.S. Ser. No. 09/081,080), for example.

The CGH elements are optical elements manufactured by using a computer program, and therefore those high-precision optical elements can be mounted in compact form on an optical substrate.

If the CGH elements are adopted, it becomes possible to mount optical elements in a compact form on a multi-layer structure of optical substrates. Those optical elements mounted include an optical demultiplexing element to separate the multiplexed light into rays of different wavelengths, or an optical coupling element to separate or couple a ray of one wavelength obtained by demultiplexing.

Therefore, by connecting optical functional elements, that is, a light-emitting element such as a semiconductor laser, and a light-detecting element such as a photodiode, to an optical device formed by a multi-layer structure, it is possible to produce an optical coupling module suitable for optical communication terminal stations capable of bi-directional communications.

For an optical coupling module mentioned above, a semiconductor substrate is generally used. One surface of a semiconductor substrate is polished to a mirror finish by a chemical and mechanical etching to improve the flatness. An optical functional element, such as a semiconductor laser or a photodiode is mounted on the mirror-finished surface of the semiconductor substrate. The optical device is supported on the semiconductor substrate that has the optical functional elements mounted thereon so that the optical functional elements on the semiconductor substrate are optically coupled to the optical device.

When a semiconductor laser is used as an optical functional element, a semiconductor laser of the end face emission type is generally adopted. Therefore, if such an end face emission type optical functional element is mounted on the mirror-finished surface of a semiconductor substrate, light from this optical functional element is emitted in a direction parallel with the mirror-finished surface of the semiconductor substrate, and the optical device, optically coupled to the semiconductor substrate to receive the emitted ray, is supported at the end face of the semiconductor substrate, which has the optical functional element mounted thereon, to form a module of a compact structure.

Because the above-mentioned end face of the semiconductor substrate is a cleavage plane and is not mirror-finished like the surface of the substrate, the flatness of the end face is very bad.

Therefore, when connecting the semiconductor substrate, on which an optical element is mounted, to the above-mentioned optical device supported to the end face of the substrate, the alignment work to align the optical axis of the optical device with the optical functional elements invariably requires three-dimensional adjustment. Therefore, this alignment work is not easy.

SUMMARY OF THE INVENTION

Accordingly, it is an object of the present invention to provide an optical coupling module, which is suitable for optical communication terminal stations, facilitates the alignment work and enables reductions in production cost, and to provide a manufacturing method of such a module should be established.

The inventor set eyes on a possibility of better use of the superb flatness of the mirror-finished surface of a semiconductor substrate on which an optical element is mounted, and has made the present invention to solve the above-mentioned problems by utilizing the flat surface to support an optical device optically coupled to the optical functional elements mounted on that surface.

According to the present invention, an optical coupling module comprises a semiconductor substrate having a mirror-finished surface and having mounted on the mirror-finished surface an optical functional element with its optical functional face kept substantially parallel with the mirror-finished surface and with a reverse face, opposite the optical functional face, facing the mirror-finished surface ; and an optical device, which is supported on the mirror-finished surface of the semiconductor substrate in such a way that the optical device is optically coupled to the optical functional elements.

According to the present invention, the optical device optically coupled to the optical functional elements mounted on the semiconductor substrate is supported by the mirror-finished surface of the semiconductor substrate with an excellent flatness obtained by mirror finish. Therefore, in aligning, in other words, positioning the optical device on the semiconductor substrate, the optical device can be placed at a correct position relatively easily by fine adjustment of its position along the (x, y) plane, that is, on the mirror-finished surface.

Thus, it is not necessary to perform three-dimensional adjustment as in alignment in the past. Because the alignment work becomes easy, it can be done by a mechanical process and in an intensive manner.

In order to perform mechanical alignment work, a set of alignment marks to indicate the optimum position for optical coupling may be attached to the mirror-finished surface of the semiconductor substrate and to the end face of the optical device that faces that surface of the semiconductor surface.

The use of the alignment marks showing the optimum position for optical coupling obviates the need of what is called active alignment to adjust the positions of the optical parts according to the actual behavior of light when the optical system including the optical device is in operation. Furthermore, by the use of the alignment marks, the alignment work can be done by what is called passive alignment, which is a mere matching work of the alignment marks in mounting the optical parts. In this way, the alignment work, including the adjustment of the optical axes of the optical device and the optical functional element, becomes all the more easy.

A recess may be formed in the mirror-finished surface so that the optical functional element can be accommodated in the recess. A light-detecting element with a light detection surface of the so-called surface detection type may be used as an optical functional element accommodated in the recess.

The above-mentioned recess for accommodating the optical functional element may be formed by etching the surface of the semiconductor substrate. By chemical etching on the semiconductor substrate, a predetermined recess can be formed relatively easily with high accuracy.

A plurality of light-detecting elements respectively coupled to the optical device may be aligned in the recess.

As an optical functional element optically coupled to the optical device, a light-emitting element of the end face emission type may be used. In addition, a light-detecting element and a light-emitting element respectively coupled optically to the optical device may be arranged in the recess.

To facilitate positioning of the light-detecting element and the light-emitting element in the recess, alignment marks may be attached to the bottom of the recess.

As the alignment marks, the electrodes for optical functional elements formed by photolithography may be used.

To guide a light from an end face emission type light-emitting element, emitted in parallel with the mirror-finished surface of the semiconductor substrate, to a direction of going away from the mirror-finished surface and traveling to the optical device, at least one side wall of the recess, which accommodates the light-emitting element, may be used as a reflecting surface.

A monitoring light-detecting element to monitor light emitted from the above-mentioned light-emitting element may be arranged at the recess. To guide a light from the other end of the light-emitting element to the monitoring light-detecting element, the other side wall of the recess may be used.

If the above-mentioned recess is called a first recess, and if a second recess is formed at the bottom surface of the first recess and the above-mentioned light-detecting element is arranged in the second recess, the light from the light-emitting element can be prevented from being obstructed by the light-detecting element, and the light-detecting element can be arranged along the optical axis of the light-emitting element.

By the above arrangements, optical design can be simplified.

Instead of a monolithic semiconductor substrate, a composite substrate composed of a semiconductor substrate and a ceramic plate or a glass plate may be used. When a composite substrate, which includes a semiconductor substrate, is used, the semiconductor substrate is preferably placed on the above-mentioned surface side where the above-mentioned recess is formed, in order to make full use of the characteristics of the semiconductor substrate.

More specifically, a semiconductor substrate, such as silicon, exhibits higher thermal conductivity than that of a ceramic plate or glass plate, and therefore the semiconductor substrate has a higher heat radiation property. For this reason, the mirror-finished surface on which the light-emitting element is mounted is preferably formed of a semiconductor substrate to prevent an unstable operation caused by an elevated temperature of the light2 emitting element, for example, a semiconductor laser disposed on the substrate.

The semiconductor substrate, which can be etched to form the recess, has better workability than a ceramic plate or a glass plate, which needs to be ground or cut to form the recess.

A ceramic plate or a glass plate has a smaller electric charge capacity than the above-mentioned semiconductor substrate. When high-speed pulses are generated by the light-emitting element, a driving circuit is provided on the above-mentioned substrate surface. In order to increase the driving speed of the driving circuit, it is desired that the charge capacity is smaller on the substrate side. In this respect, it is preferable to use a ceramic plate or a glass plate.

A composite substrate of a semiconductor substrate and a ceramic plate or a glass plate, having their respective characteristics, is most preferable.

The optical device may have on one end face of it a first input terminal to receive multiplexed light including rays of different wavelengths and a first output terminal to output a ray of a first waveform component separated from the multiplexed light received from the first input terminal. The optical device may have on the end face of it a second input terminal and a second output terminal to enable bi-directional communications by directing to the first input terminal a ray of a second wavelength component separated from the multiplexed light.

The optical device is supported by the semiconductor substrate with the above-mentioned one end face facing the mirror-finished surface of the semiconductor substrate such that the second input terminal and the second output terminal respectively correspond to the emission face of the light-emitting element and the detection face of the light-detecting element.

A set of alignment marks can be attached to one end face of the optical device and to the mirror-finished surface of the semiconductor substrate. By aligning the corresponding alignment marks, the semiconductor substrate and the optical device can be easily positioned in the aligned position where the second input terminal and the second output terminal respectively correspond to the emission face of the light-emitting element and the detection face of the light-detecting element.

As the optical elements of the optical device, computer generated hologram (CGH) elements may be used, and by laminating a plurality of optical substrates including optical elements, a CGH element for example, an optical device can be composed in a compact form.

A method of manufacturing an optical coupling module according to the present invention, having a semiconductor substrate having a mirror-finished surface and having mounted on the mirror-finished surface an optical functional element with an optical functional surface kept substantially parallel with the mirror-finished surface and with a reverse surface, opposite the optical functional surface, facing the mirror-finished surface; and an optical device, supported on the mirror-finished surface of the semiconductor substrate in such a way that the optical device is optically coupled to the optical functional element, the manufacturing method comprising the steps of:

mounting a large number of the optical functional elements in high density on a semiconductor wafer as an aggregate of the semiconductor substrates;

forming in high density a plurality of the optical devices in the form of a multi-layer structure including a plurality of the optical substrates including the optical elements;

then collectively joining the semiconductor wafer with the multi-layer structure of the optical substrates such that the optical functional elements on the semiconductor wafer are optically coupled respectively to the optical elements on the multi-layer structure corresponding to the optical functional elements, thereby forming optical coupling modules in high density; and separating a plurality of optical coupling modules formed in high density into individual modules, wherein it becomes possible to manufacture a large number of optical coupling modules.

According to the manufacturing method according to the present invention, as described above, a plurality of the optical functional elements are mounted in high density on a semiconductor wafer formed as an aggregate of the semiconductor substrates, and a plurality of optical devices are formed in high density as a multi-layer structure of a plurality of optical substrates including optical elements. Subsequently, the semiconductor wafer and the multi-layer structure of the optical substrates are joined together such that the optical functional elements on the semiconductor wafer are respectively coupled optically to the optical elements of the multi-layer structure corresponding to the optical functional elements. Therefore, a large number of optical coupling modules are formed in high density integration.

Therefore, by separating a plurality of optical coupling modules formed in high density into individual modules, a large number of optical coupling modules can be manufactured easily and efficiently.

According to another aspect of the present invention, there is provided an optical coupling module comprising:

an optical device formed as a multi-layer structure by laminating a plurality of optical substrates including at least one computer generated hologram, having at least one optical fiber joined to one end face thereof located in the direction of lamination and having at the other end face thereof an output terminal or an input terminal for a light traveling from the optical fiber and passing through the computer generated hologram;

a semiconductor substrate having a recess formed to accommodate said multi-layer structure of said optical device by being located sideways with the laminated direction thereof extending at right angles with the depth direction, also having a corresponding groove to accept and position said optical fiber formed on one side of the upper surface where the recess is open, and having alignment marks formed on the other side of the upper surface where said recess is open; and an optical functional element arranged at a predetermined position defined by the alignment marks on the upper surface of said semiconductor substrate and optically coupled to the output terminal or the input terminal of said multi-layer structure, wherein said groove and the alignment marks at the upper surface of said semiconductor substrate are formed by photolithography and etching with a single mask.

In the optical coupling module according to the present invention, the multi-layer structure having an optical fiber coupled thereto at one end thereof and an input terminal or an output terminal provided on the other end thereof is accommodated in a groove formed on one side of the upper surface of the semiconductor substrate where the recess is open when the multi-layer structure is accommodated in the groove. The optical functional element optically coupled to the input terminal or the output terminal provided on the other end of the semiconductor substrate is placed at a correct position by using the alignment marks formed by photolithography and etching performed simultaneously with the formation of the groove.

Therefore, in the adjustment of the optical coupling of the optical functional elements with the multi-layer structure, the alignment work can be done by passive alignment by the alignment marks, which has been described, without doing active alignment that requires that the optical functional elements be operated. Thus, the alignment work, including optical axis adjustment between the optical device and the optical functional elements, becomes still more easier.

The multi-layer structure is generally in the shape of a rectangular parallelepiped, for example. If the clearance between the side face of the multi-layer structure that faces the bottom surface of the recess when the multi-layer structure is accommodated in the recess and the optical fibers is set at a value smaller than the distance between the bottom portions of the grooves and the bottom surface of the recess, then the recess can be given a large depth enough to leave a clearance between the bottom surface of the recess and the side face of the multi-layer structure that faces the bottom surface.

The optical fibers can be connected to the multi-layer structure through a connection plate having holes for accepting the end portions of the optical fibers and fixedly connected to one end of the multi-layer structure. The connection plate can be accommodated in the recess as one body with the multi-layer structure.

When the optical element is a semiconductor laser, it is preferable to provide at the other end of the multi-layer structure an optical nonreciprocity elememt to prevent the beam from the semiconductor laser from returning to the semiconductor laser.

Ferrules may be fitted on the optical fibers to be accommodated in the grooves in the semiconductor substrate, and in this case the grooves accommodate the optical fibers through the ferrules.

The optical fibers and the ferrules covering the optical fibers may be made to protrude beyond the end faces of the semiconductor substrates of the multi-layer structure.

The protruding end portions and sleeves combine to jointly form a detachable receptacle structure. Each sleeve accepts at one end the protruding end portion and accepts at the other end an optical fiber to be connected to the protruding end portion and a ferrule as well, which covers the optical fiber.

DETAILED DESCRIPTION OF THE PREFERRED EMBODIMENTS

<Embodiment 1>

Figure 1:
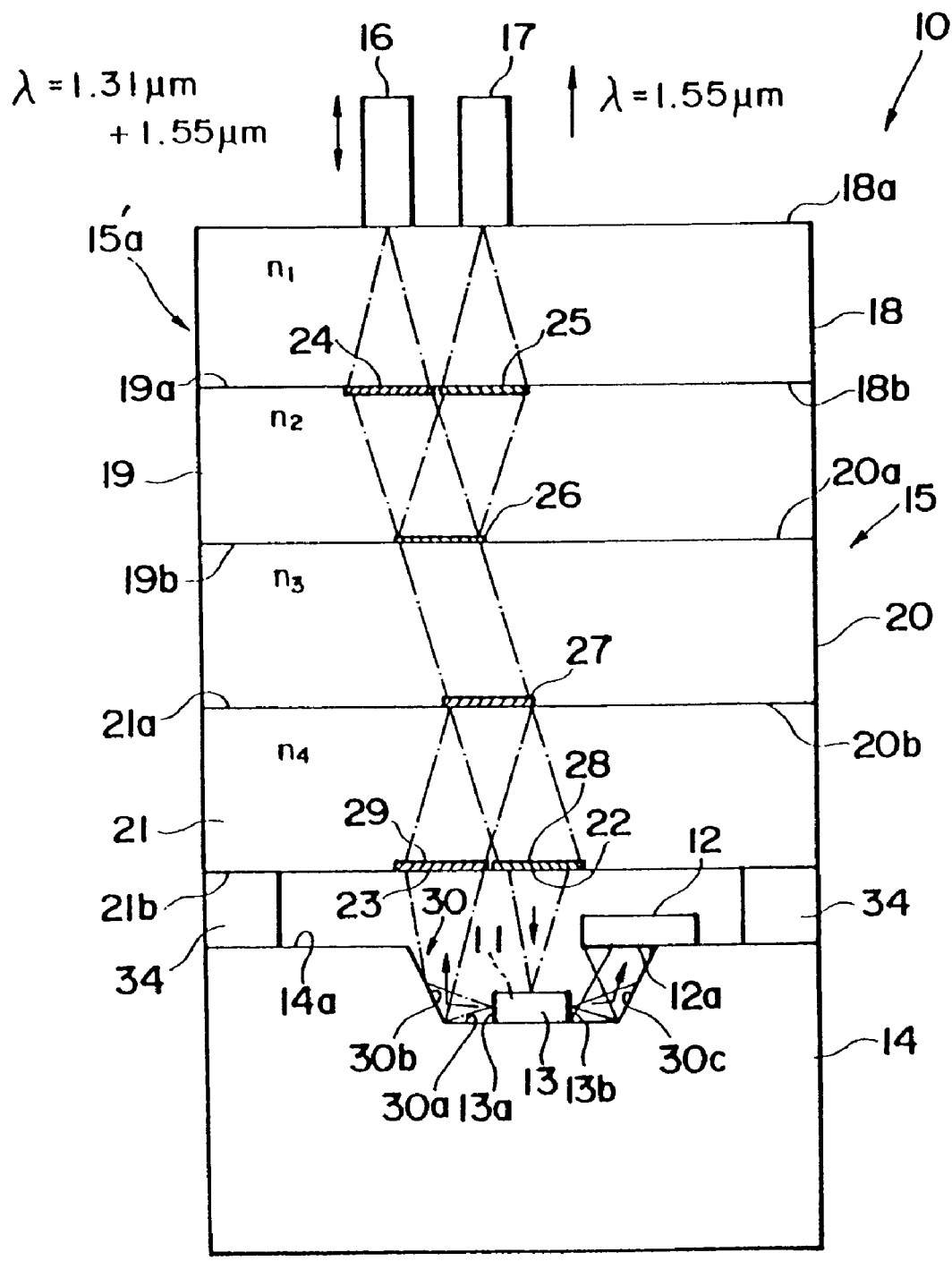
FIG. 1 is a longitudinal sectional view schematically showing a first embodiment of the optical coupling module according to the present invention.
Figure 2:
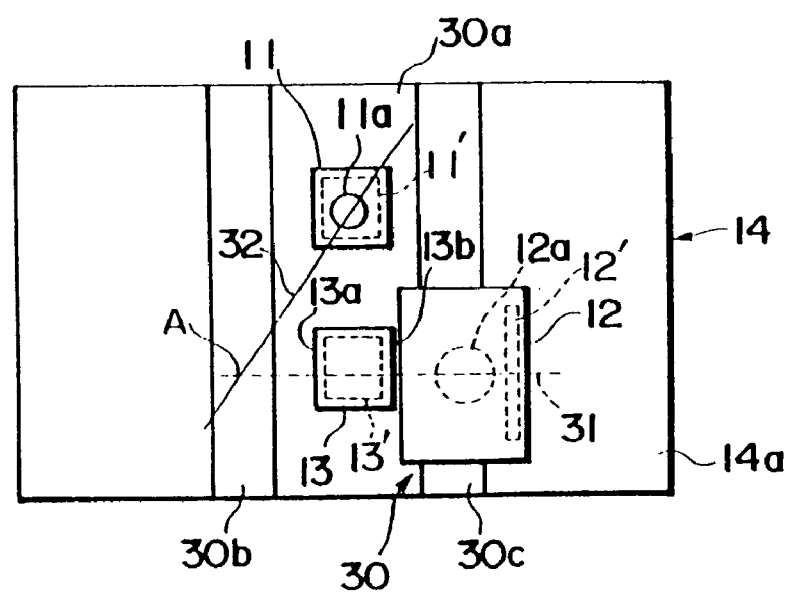
FIG. 2 is a plan view showing a semiconductor substrate and an optical functional element of the optical coupling module shown in FIG. 1.

FIGS. 1 and 2 schematically show a first embodiment of the optical coupling module according to the present invention. As shown in FIGS. 1 and 2, an optical coupling module 10 according to the first embodiment comprises an optical device 15 including three optical functional elements 11, 12 and 13, which are more specifically two light-detecting elements 11 and 12 and one light-emitting element 13 (the light-detecting element 11 is not shown in FIG. 1 because it is behind the light-emitting element 13); a semiconductor substrate 14 for mounting those optical functional elements; and a block-shaped multi-layer structure 15a' supported on the semiconductor substrate.

In the first embodiment, the optical device 15 includes, for example, a first glass substrate 18 having attached on one surface thereof a first input terminal 16 and a first output terminal 17 to be connected to optical fibers, not shown; a second glass substrate 19 having one surface thereof 19a bonded to the other surface 18b of the glass substrate 18; a third glass substrate 20 having one surface thereof 20a bonded to the other surface 19b of the glass substrate 19; and a fourth glass substrate 21 having one surface thereof 21a bonded to the other surface 20b of the glass substrate 20.

The refractive indexes n1 to n4 of the respective glass substrates 18 to 21 can be selected suitably to make them the same value or to make them mutually different. Instead of the glass substrates 18 to 21, other materials, such as semiconductor substrates, which are optically equivalent, may be used as the optical substrates 18 to 21.

Light input to the first input terminal 16 is a multiplexed light having component beams of wavelengths bands of 1.3 $\mu$m and 1.5 $\mu$m, for example, as signal carriers.

One of those wavelength components is guided to the first output terminal 17.

A pair consisting of a second input terminal 23 and a second output terminal 22, which enable bi-directional communications, are provided on the other surface 21b of the glass substrate 21, which concurrently is the other end of the multi-layer structure 15a'. On one end of the multi-layer structure 15a' there are mounted the first input terminal 16 and the first output terminal 17.

The second input terminal 23 receives light from the light-emitting element 13 on the semiconductor substrate 14. The second output terminal 22 emits light of the other wavelength component to one light-detecting element 11 on the semiconductor substrate 14.

First and second computer generated holograms (hereafter referred to simply as CGH elements) 24 and 25 are arranged between the first and the second glass substrates 18 and 19.

A WDM filter 26 as a wavelength demultiplexing element is arranged between the second glass substrate 19 and the third glass substrate 20. A third CGH element 27 is arranged between the third glass substrate 20 and the fourth glass substrate 21.

Fourth and fifth CGH elements 28 and 29 are arranged at the second output terminal 22 and the second input terminal 23 formed on the other surface 21b of the fourth glass substrate, which is the other end of the multi-layer structure.

In the example of FIG. 1, the first and second CGH elements 24 and 25 are formed in parallel on the other surface 18b of the first glass substrate 18. The demultiplex WDM filter, in other words, the wavelength selection filter 26 is formed on the other surface 19b of the glass substrate 19.

The third CGH element 27 is formed on the other surface 20b of the third glass substrate 20.

As described above, the fourth and fifth CGH elements 28 and 29 are formed in parallel on the other surface 21b of the glass substrate 21, and they respectively define the second output terminal 22 and the second input terminal 23.

The CGH element 24 has a function of collimating a divergent spherical wave of multiplexed light from the first input terminal 16 into a parallel beam, and also has a deflection function of directing the parallel beam to the WDM filter 26.

The WDM filter 26 reflects to the second CGH element 25 a first wavelength component of 1.55 $\mu$m included in the multiplexed light guided to the first CGH element 24. The WDM filter 26 allows a second wavelength component of 1.3 $\mu$m in the multiplexed light to pass through.

A parallel beam of 1.55 $\mu$m wavelength, which is the first wavelength component reflected by the WDM filter 26, is converged by the second CGH element 25, which has a converging function, towards the first output terminal 17. The beam of the first wavelength component emerging from the first output terminal 17 is sent to the terminal unit in uni-directional communication, such as television broadcast.

The parallel light beam of 1.3 μm wavelength as the second wavelength component having passed through the WDM filter 26 is deflected to the fourth CGH element 28 and the fifth CGH element 29 by the third CGH element 27 with a splitting function utilizing high-order diffraction.

When this third CGH element 27 is of 2-phase linear grating type, the diffraction efficiency is about 40% both for the plus 1-order diffracted light and the minus 1-order diffracted light; thus, the CGH element 27 functions as a 1:1 wavelength demultiplexer.

With CGH elements, various splitting functions can be realized by selecting the number of lithographic etching masks, in other words, the number of phases and by controlling the etching depth.

The parallel light beam of the second wavelength component directed to the fourth CGH element 28 is able to be converged on the light-emitting element 13 by the converging action of the fourth CGH element 28. The parallel light beam of the second wavelength component directed to the fifth CGH element 29 is further directed to the light-detecting element II by the converging action of the fifth CGH element 29. The light-detecting element 11 is connected with a receiving circuit of a telephone set, for example, and information included in the second wavelength component is extracted.

In the above-mentioned optical system of the optical device 15, when an optical signal of the second wavelength component corresponding to information signal from the receiving circuit of a telephone set, for example, is diverged from the light-emitting element 13 to the fourth CGH element 28, the light beam of the second wavelength component passes through the third CGH element 27, the WDM filter 26 and the first CGH element 24, and is guided to the first input terminal 16.

Therefore, bi-directional communications between a multiplexed light source (not shown) and the optical device 10 to receive the multiplexed light with the first input terminal 16 is made possible by the use of the second output terminal 22 and the second input terminal 23 of the optical device.

In the manufacture of CGH elements mentioned above, CAD is used. For CAD, a phase difference function of light in a hologram showing desired diffraction optical characteristics is obtained. This phase difference function is called an optical path difference function ρ(x, y). By obtaining an optical path coefficient, that is, a phase coefficient $C_N$ of this optical path difference function and substituting the phase coefficient $C_N$ into a CAD program, a lithographic mask pattern can be generated which is required to produce a desired shape by photolithography.

CghCAD by NIPT in California, U.S.A. is an example of a CAD program described above.

By running this CAD program, the conditions of masks required to produce a CGH element showing desired diffraction optical characteristics can be obtained.

By making masks in compliance with the mask conditions, by performing etching on glass substrates 18 to 21 as optical substrates by photolithography using those masks, CGH elements 24 to 29 exhibiting the desired diffraction optical characteristics can be formed.

A semiconductor substrate 14 has mounted thereon the light-detecting element 11 and the light-emitting element 13, which are optically coupled to the above-mentioned optical device 15. The semiconductor substrate 14 is formed, for example, by a silicon crystal substrate with a surface 14*a* that is identified as a (100) plane, and mirror-finished by chemical etching.

The light-detecting elements 11 and 12 and the light-emitting element 13 are mounted on this mirror-finished extraordinarily flat surface 14*a* of the semiconductor substrate 14.

In the example shown in FIGS. 1 and 2, the mirror-finished surface 14*a* was partially etched, by which a recess 30 was formed.

The recess 30 has a bottom surface 30*a* parallel with the mirror-finished surface 14*a* and also has a pair of inclined side walls 30*b* and 30*c* rising from both ends of the bottom surface to directions of the walls separating from each other. The recess 30 accommodates one light-detecting element 11 and the light-emitting element 13, and the other light-detecting element 12 is arranged at the shoulder portion of the semiconductor substrate 14 that defines the recess 30.

The one light-detecting element 11 is an optical functional element having a light-detection face on its surface. For this optical functional element, a surface light detection type photodiode, for example, may be used.

The light-detecting element 11 is fixed with its reverse surface, which is opposite its light detection face, attached to the bottom surface 30*a* of the recess 30 in such a way that the light detection face 11*a* is substantially parallel with the mirror-finished surface 14*a* of the semiconductor substrate 14 so as to receive an optical signal from the second output terminal 22 of the optical device 15.

The light-detecting element 11 performs a function of converting an optical signal from the second output terminal 22 into an electric signal.

The light-emitting element 13 is an end face emission type optical functional element that has light emission faces at the end faces. For example, an end face emission type semiconductor laser, having emission faces 13*a* and 13*b* provided one on each end of the laser, may be used.

The light-emitting element 13 is fixed to the bottom surface 30*a* of the recess 30 in such a way that the emission faces 13*a* and 13*b* respectively face corresponding inclined side walls 30*b* and 30*c* of the recess 30 and that the optical axis 31 intersects a projected line 32 of a center line connecting the centers of the second output terminal 22 and the second input terminal 23 of the optical device 15 at point A and at an angle of 45°.

A laser beam from the light emission face 13*a* of the light-emitting element 13 is reflected by one inclined side wall 30*a* so as to travel to the second input terminal 23.

A laser beam from the other light emission face 13*b* of the light-emitting element 13 is reflected by the other inclined side wall 30*b* so as to travel to the light detection face 12*a* of the other light-detecting element 12.

The other light-detecting element 12 is an end face detection photodiode as in the light-detecting element 11. The light-detecting element 12 is arranged with its light detection face 12*a* not only facing down but also positioned substantially parallel with the bottom surface 30*a*, and fixed to the upper surface 14*a* of the semiconductor substrate 14. The light-detecting element 11 receives a laser beam from the light-emitting element 13 to use it for monitoring purposes.

Figure 3:
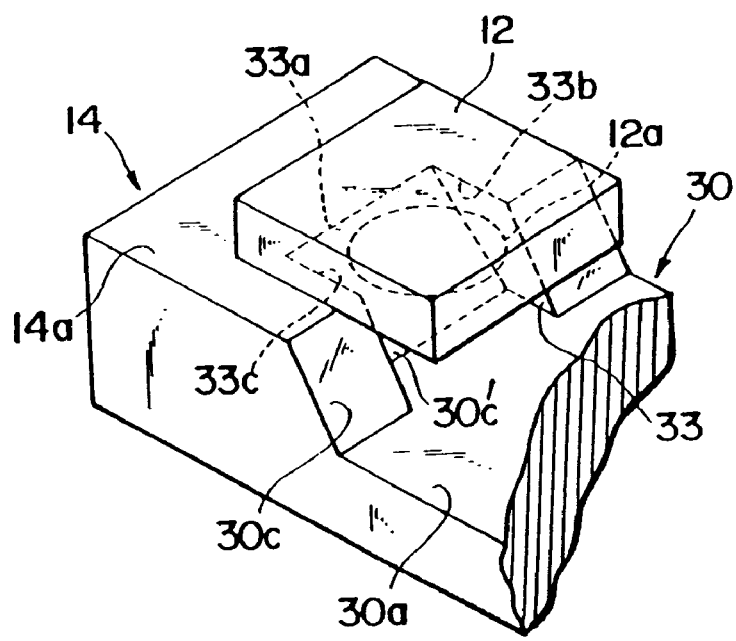
FIG. 3 is a partially broken away view in perspective of the substrate.

In the example shown in FIG. 3, in the inclined side wall 30*c*, there is formed a recess 33 which defines an inclined wall face 30*c'* that is parallel with and substantially the same as the inclined side wall 30*c*. The other light-detecting element 12 is arranged with its light detection face 12*a* facing the recess 33, and is secured to the three upper peripheral portions 33a, 33b and 33c of the recess 33.

Therefore, in the example of FIG. 3, a laser beam from the other light emission face 13b of the light-emitting element 13 is reflected to the light detection face 12a of the light-detecting element 12 by the inclined wide wall 30c' substantially the same as the inclined side wall 30c.

Right inclined angles of the inclined side walls 30b and 30c' as the reflecting faces can be formed by (111) planes, which form an angle of 45° with the bottom surface 30a of the recess 30. The inclined side walls 30b and 30c' formed by the (111) planes can be generated easily by selection of an etchant.

To improve the reflectance of each of the inclined side walls 30b and 30c' as the reflecting faces, a metal reflecting film is preferably deposited on the inclined side walls 30b and 30c' by vapor deposition, for example.

For convenience in mounting the optical functional elements 11, 12 and 13 on the semiconductor substrate 14, markings may be provided at proper positions on the semiconductor substrate 14 for positioning the optical functional elements 11, 12 and 13. By using the markings, the optical functional elements 11, 12 and 13 can be arranged relatively easily at the right optical coupling positions.

For the markings, electrodes (11', 12' and 13') formed on the semiconductor substrate 14 for the optical functional elements 11, 12 and 13 may be used.

The electrodes (11', 12' and 13') are formed by a photolithographic technique with allowable errors of 1 μm or less. Therefore, the optical functional elements 11, 12 and 13 can be positioned with extremely high accuracy by image recognition technology using those electrodes (11', 12' and 13') as alignment marks.

The optical device 15 is connected at the other end 21b of it to the mirror-finished surface 14a of the semiconductor substrate 14 on which the optical functional elements 11, 12 and 13 are mounted.

In the example of FIG. 1, the optical device 15 is connected to the semiconductor substrate 14 through the intermediary of a spacer 34 made of a semiconductor material, for example.

The spacer 34 can be formed in a body monolithic with the semiconductor substrate by etching the surface 14a of the semiconductor substrate 14, for example.

When connecting those components 14 and 15, alignment is performed so that the light from the second output terminal 22 is securely guided to the light-detecting element 11 and a laser beam from the light emission face 13a of the light-emitting element 13 is securely guided to the input terminal 23.

According to the optical coupling module 10 of the present invention, in the alignment between the semiconductor substrate 14 and the optical device 15, for example, the optical device 15 is moved by parallel displacement along the mirror-finished surface 14a of the semiconductor substrate 14 used as the reference plane, on which is imparted an outstanding flatness by mirror finish. In this way, the light-detecting element 11 and the light-emitting element 13, and the second output terminal 22 and the second input terminal 23, can be placed at the right positions where they can be optically coupled respectively.

Therefore, it becomes unnecessary to adjust the inclination of the axis in the thickness direction of the glass substrates 18 to 21, in other words, the inclination related to the Z-axis can be obviated. Consequently, adequate alignment can be achieved by alignment on a plane including the X-axis and the Y-axis, namely, on the mirror-finished surface 14a of the semiconductor substrate 14.

<Embodiment 2>

Figure 4:
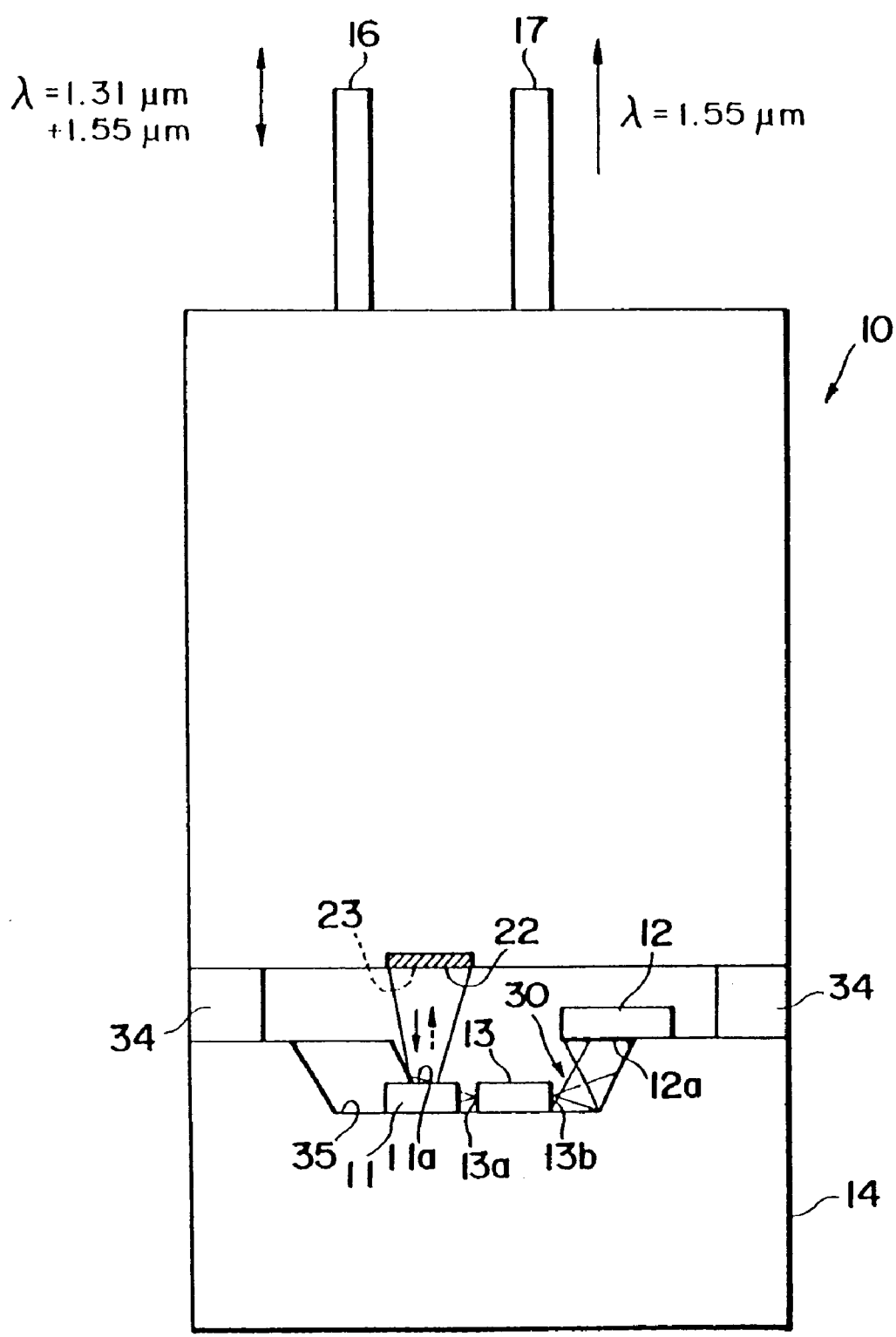
FIG. 4 is a longitudinal sectional view schematically showing a second embodiment of the optical coupling module according to the present invention.
Figure 5:
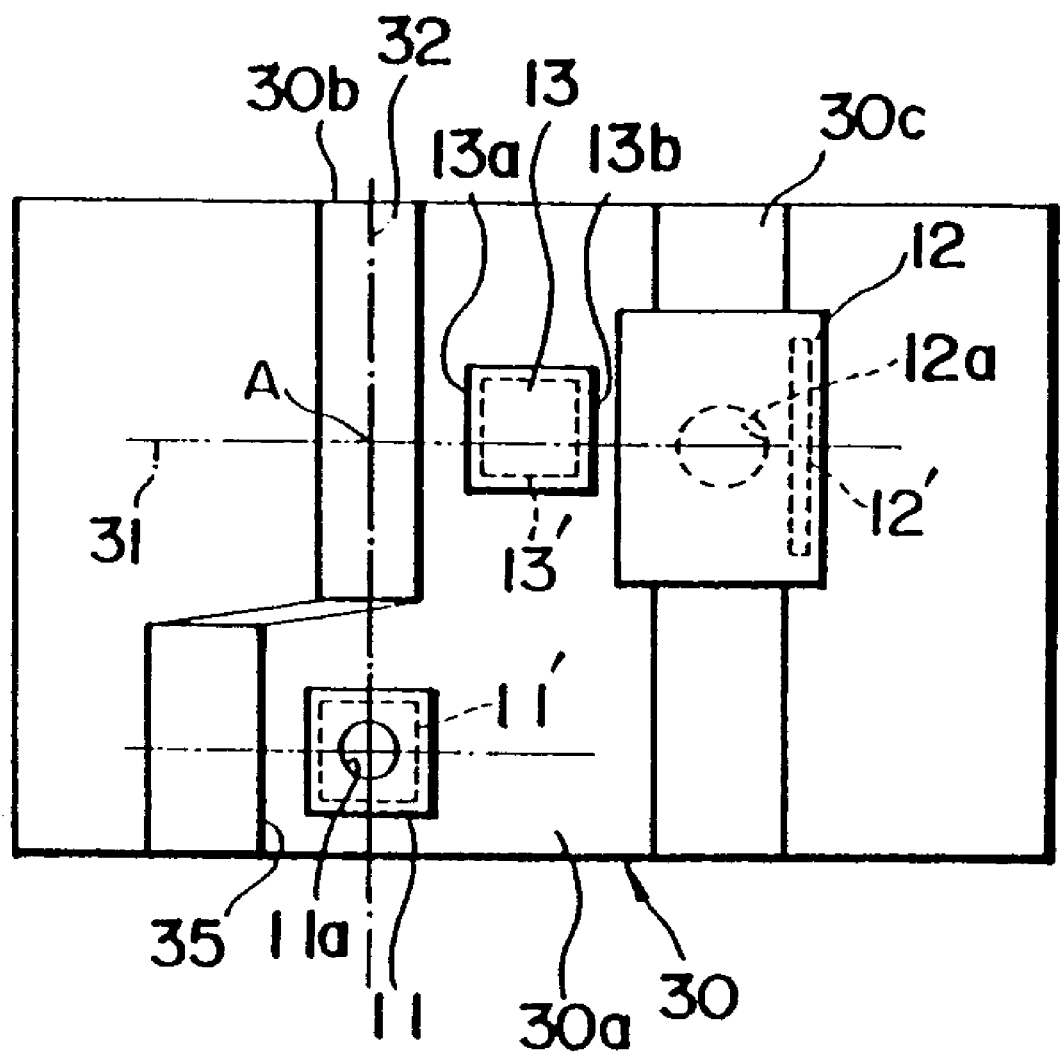
FIG. 5 is a plan view showing the semiconductor substrate and the optical functional element of the optical coupling module shown in FIG. 2.

In the optical coupling module shown in FIGS. 4 and 5, as clearly shown in FIG. 5, a projected line 32 of a center line connecting the second output terminal 22 and the second input terminal 23 of the optical coupling module 10 lies at right angles to the optical axis 31 of the light-emitting element 13. The projected line 32 extends along the one inclined side wall 30b. Therefore, a recess 35 is provided in the inclined side wall 30b so that the light-detecting element 11 is held in a right position to receive the light from the second output terminal 22.

The light-detecting element 11 is partially located in the recess 35 so that the light detection face 11a is positioned to face the second output terminal 22 of the optical device 15.

In the second embodiment, the projected line 32 of the center line connecting the second output terminal 22 of the fourth CGH element 28 and the second input terminal 23 of the fifth CGH element 29 can be made coincident with the extending direction of the recess 30, by which the construction can be simplified.

The above arrangement is not restrictive, but the optical functional elements 11, 12 and 13, including the light-detecting element 11 and the light-emitting element 13, may be arranged suitably on the semiconductor substrate 14 in accordance with the positional relation between the second output terminal 22 and the second input terminal 23 of the optical device 15.

Figure 6:
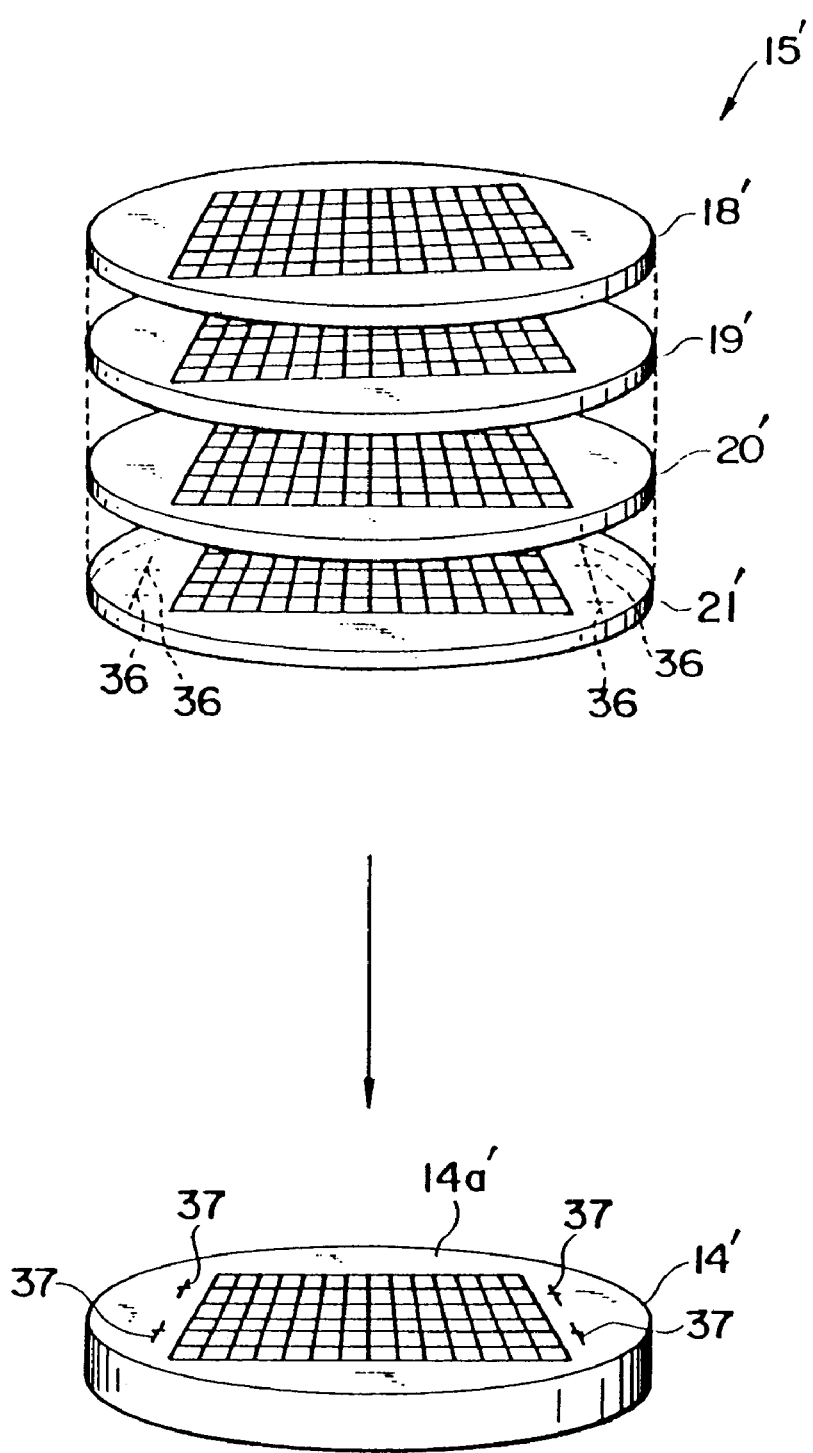
FIG. 6 is a perspective view showing a method of manufacturing the optical coupling module according to the present invention.

In the manufacture of the above-mentioned optical coupling module 10, as shown in FIG. 6, it is possible to make a large number of partitions on large glass substrates 18' to 21' and form optical elements 24 to 29 in high density integration necessary for individual partitions.

The large glass substrates 18' to 21' in which the optical elements 24 to 29 have been fabricated are joined together in a laminated body. By the joining of the glass substrates 18' to 21', a multi-layer structure 15' is formed by high density integration of a multitude of optical devices 15.

On the other hand, the mirror-finished surface 14a' of the semiconductor wafer 14' in the form of an aggregate of semiconductor substrates 14 are separated into the partitions of the substrates 18' to 21', and each partition includes the optical functional elements 11, 12 and 13.

Subsequently, the multi-layer structure 15', including a large number of optical devices 15 made by bonding of the glass substrates 18' to 21', and the semiconductor wafer 14' as an aggregate of semiconductor substrates 14 incorporating the optical functional elements 11, 12 and 13 are joined together.

Before the above joining process, the alignment marks 36 and 37 showing the right optical coupling position are formed on the lower surface of the multi-layer structure 15' and also on the upper surface 14a' of the semiconductor wafer 14'. By aligning the alignment marks 36 and 37, those two sections can be aligned correctly.

By the adoption of the alignment marks, and also by the use of an image recognition mechanism as in the alignment of the optical functional elements 11, 12 and 13, alignment work with high efficiency and accuracy is made a reality.

After the multi-layer structure 15' and the semiconductor wafer 14' have been joined together, the optical coupling modules 10 can be separated according to the partitions. Thus, a large number of optical coupling modules 10 can be manufactured efficiently.

Figure 7:
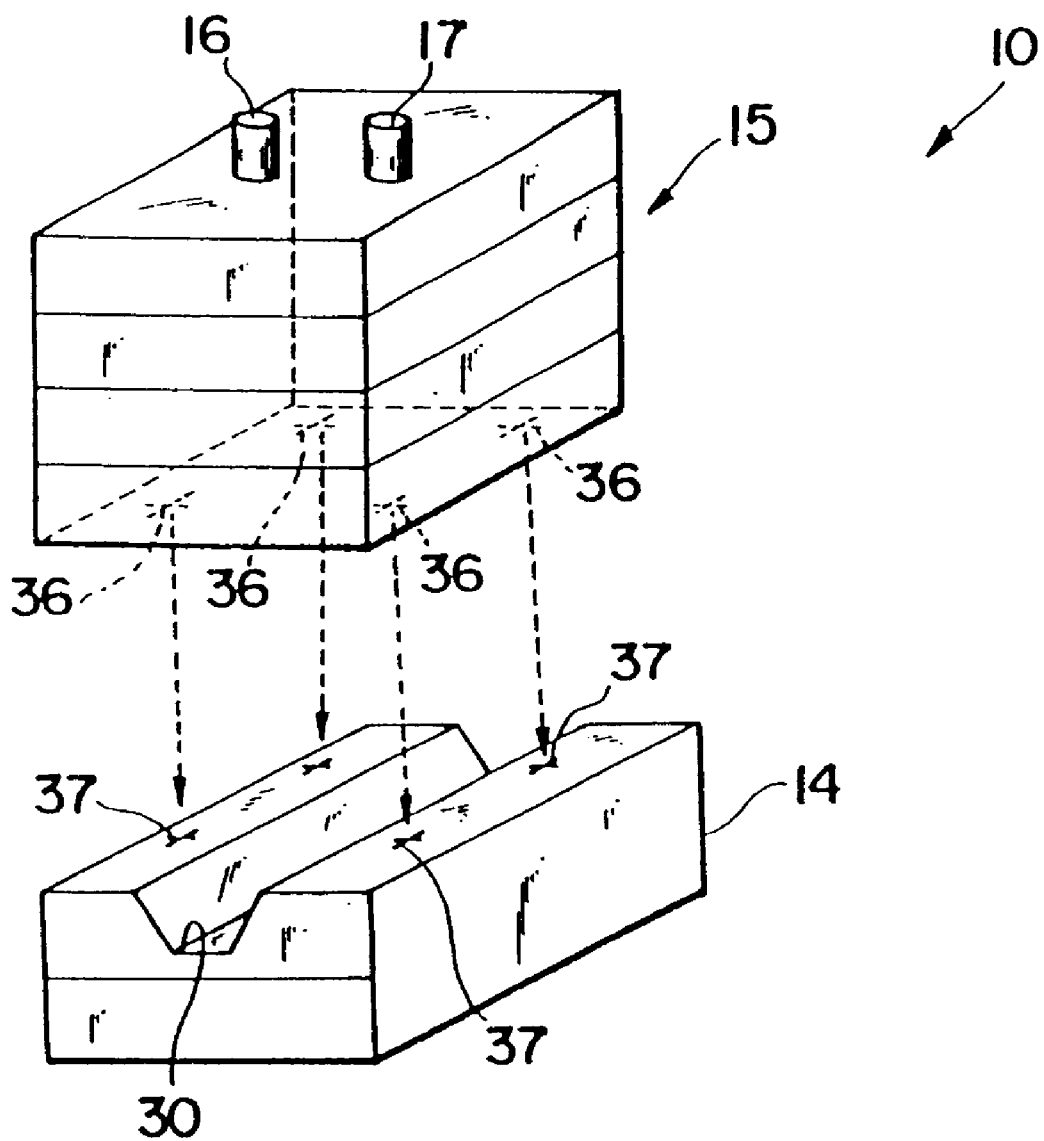
FIG. 7 is a perspective view showing another method of manufacturing the optical coupling module according to the present invention.

Without joining the semiconductor wafer 14' and the multi-layer structure 15', as shown in FIG. 7, a semiconductor substrate 14, including the optical functional elements 11, 12 and 13, and an optical device 15 may be sawed out from the semiconductor wafer 14' and the multi-layer structure 15', and then the semiconductor substrate 14 and the optical device 15 may be joined together to form an optical coupling module 10.

In this case, to facilitate the alignment between the semiconductor substrate 14 and the optical device 15, alignment marks 36 and 37 can be attached to the mirror-finished surface 14a of the semiconductor substrate 14 and the underside of the optical device 15 in the same manner as has been described.

After the semiconductor substrate 14 and the optical device 15, respectively provided with the alignment marks 36 and 37, have been respectively cut out of the semiconductor wafer 14' and the multi-layer structure 15', and by joining them together, automatic assembly of the optical coupling module 10 with high accuracy becomes possible by using a relatively small image recognition mechanism.

<Embodiment 3>

Figure 8:
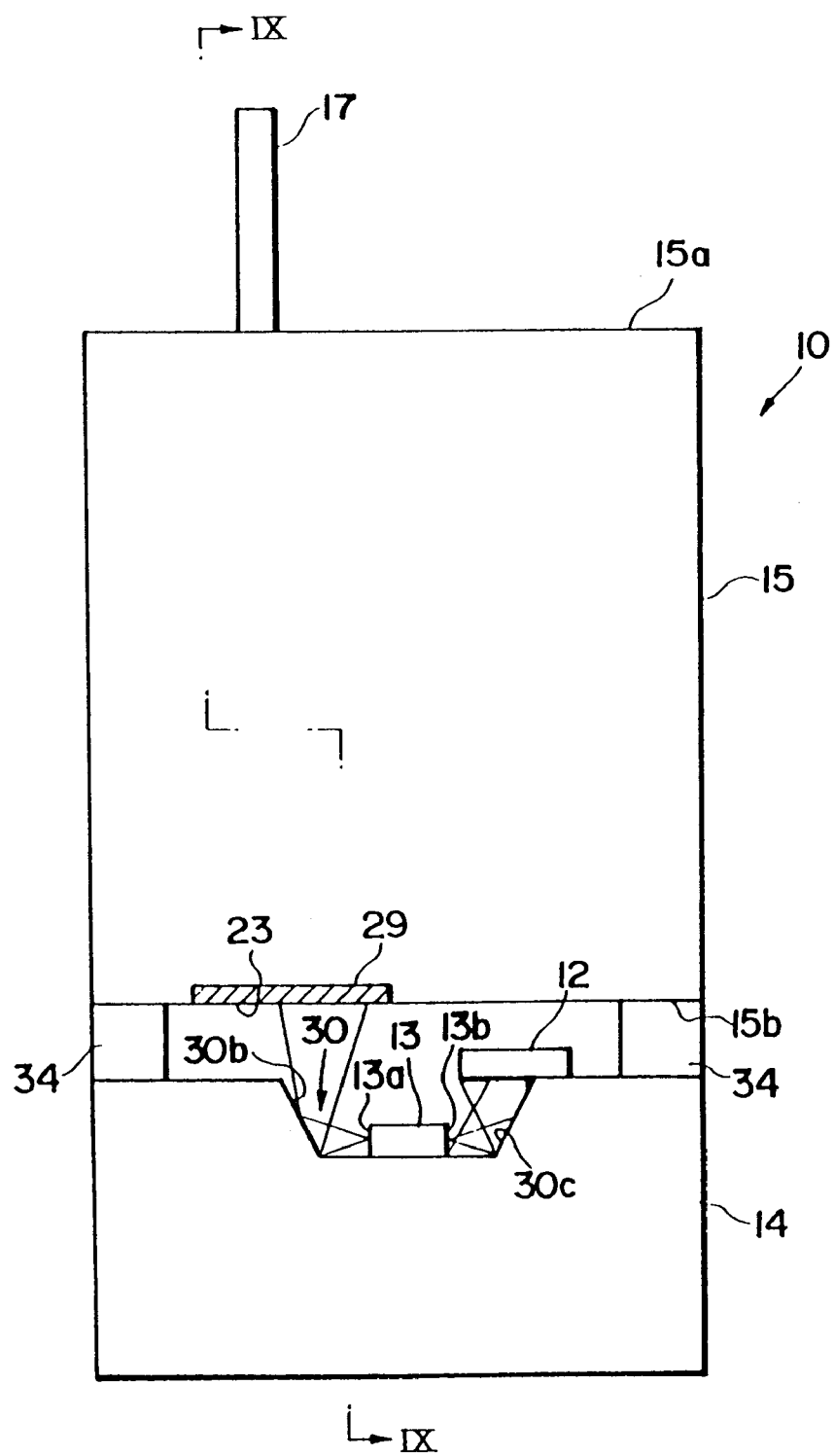
FIG. 8 is a longitudinal sectional view schematically showing a third embodiment of the optical coupling module according to the present invention.
Figure 9:
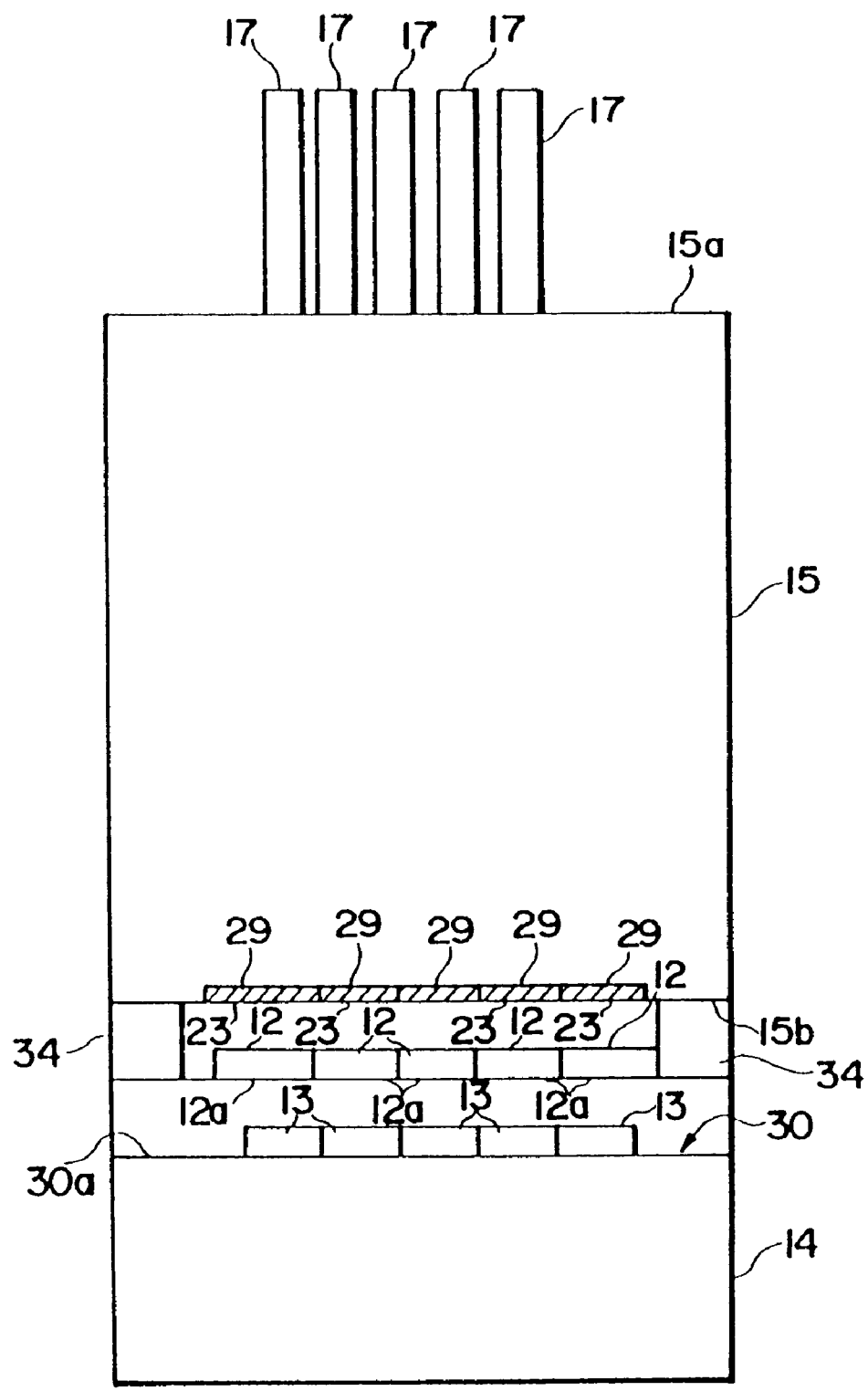
FIG. 9 is a sectional view taken along line IX—IX shown in FIG. 8.
Figure 10:
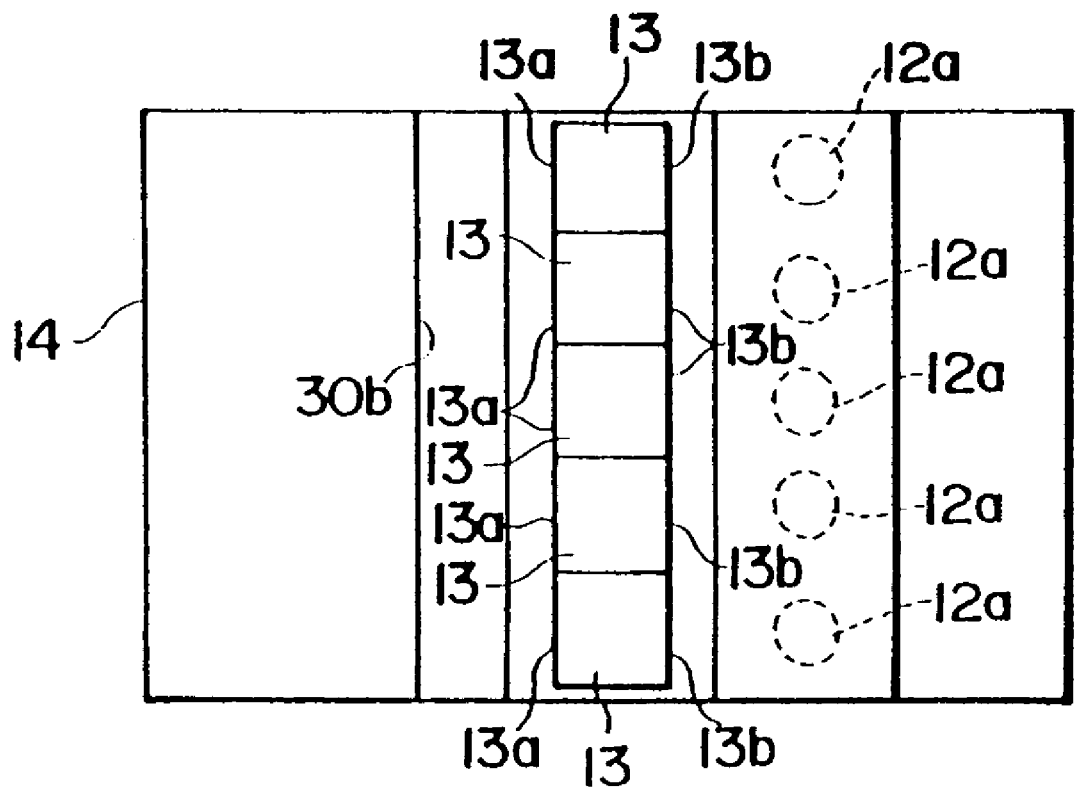
FIG. 10 is a plan view showing the semiconductor substrate and the optical functional elements of the optical coupling module shown in FIG. 8.

In the optical coupling module 10 in a third embodiment shown in FIGS. 8 to 10, the optical device 15 has at one end 15a a number of output terminals 17, and at the other end 15b a lens array formed of CGH elements 29 corresponding to the output terminals 17.

A number of light-emitting elements 13 corresponding to the CGH elements 29 are arranged in the recess 30 of the semiconductor substrate 14 as shown in FIGS. 9 and 10.

As clearly shown in FIG. 8, a laser beam from one light emission face 13a of each light-emitting element 13 is reflected by one inclined side wall 30b of the recess 30, passes through the CGH element 29 at the corresponding input terminal 23, and is guided to the output terminal 17 corresponding to the CGH element 29.

Corresponding to the light-emitting elements 13, there are provided in a row light-detecting elements 12 having light detection faces 12a each receiving as a monitor ray a laser beam from the other light emission face 13b after it has been reflected by the other inclined side wall 30c.

The surface 14a of the semiconductor substrate 14, on which optical functional elements 13, including a large number of light-emitting elements are mounted, have been mirror-finished to an extremely high flatness, and the optical device 15 is connected to the surface 14a through the spacer 34 in the same manner as has been described.

Therefore, in the optical coupling module 10 in the third embodiment, like in the first and second embodiments, the optical device 15 is connected by using the extremely flat surface 14 of the semiconductor substrate 14 as the reference plane. Because of this, the alignment work for correct coupling of the optical device 15 to the light-emitting elements 13 on the semiconductor substrate 14 has become easier than before.

<Embodiment 4>

Figure 11:
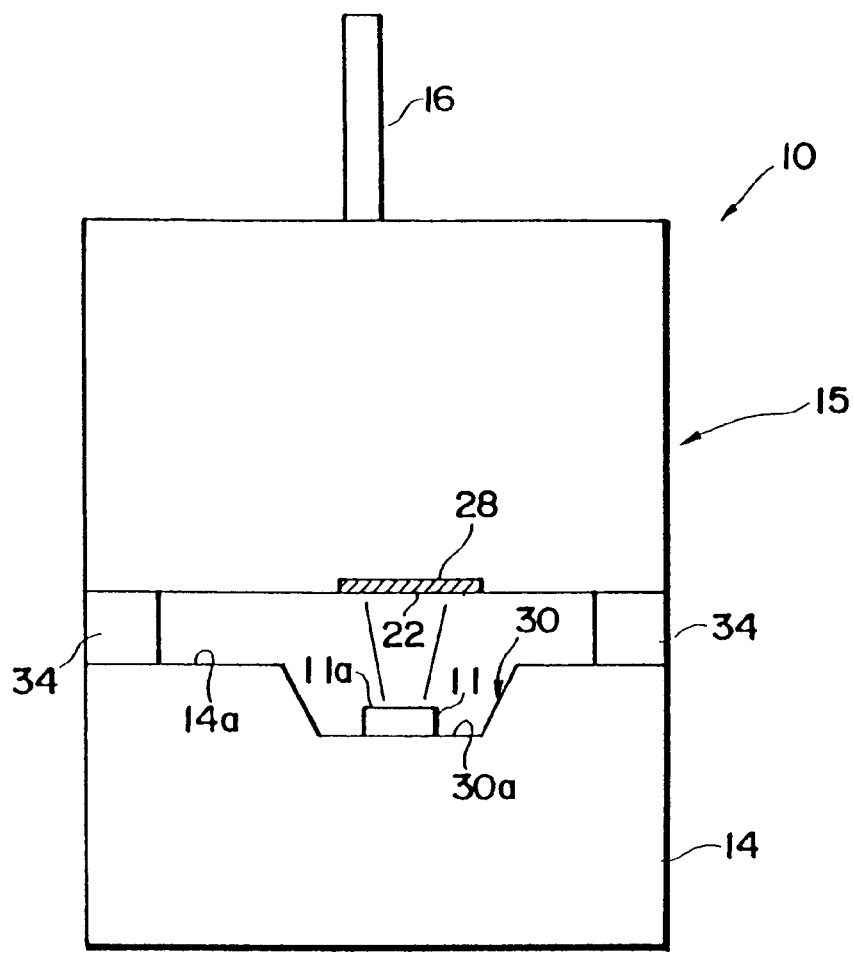
FIG. 11 is a longitudinal sectional view schematically showing a fourth embodiment of the optical coupling module according to the present invention.
Figure 12:
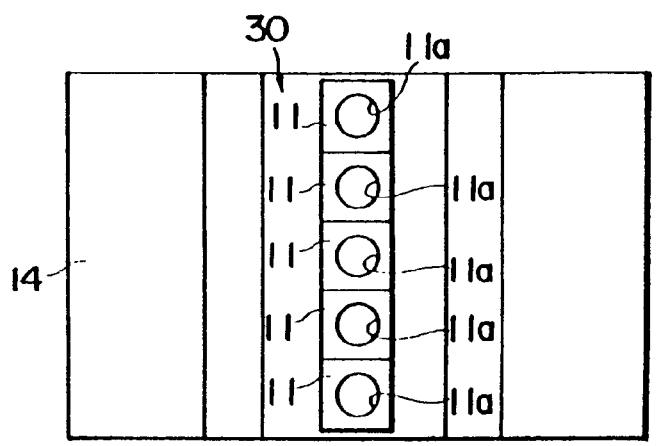
FIG. 12 is a plan view showing the semiconductor substrate and the optical functional elements of the optical functional module shown in FIG. 11.

In the optical coupling module 10 in a fourth embodiment shown in FIGS. 11 and 12, the optical device 15 has at one end an input terminal 16 for receiving multiplexed light of different wavelengths. The optical device 15 has at the other end a CGH element 28 with a wavelength demultiplex function of deflecting a certain wavelength component out of a light that has entered from the input terminal 16.

The CGH element 28 with a wavelength demultiplex function guides a wavelength component out of a light, which has entered from the input terminal 16, at a deflection angle corresponding to this wavelength to the bottom surface 30a of the recess 30 of the semiconductor substrate 14.

At the bottom surface 30a of the recess 30 of the semiconductor substrate 14, there are arranged a large number of light-detecting elements 11 with their light detection faces 11a directed upwards to receive rays of wavelength components guided at respective deflection angles.

In the optical coupling module 10 in the fourth embodiment 4, like in the first to third embodiments, the optical device 15 is connected by using the extraordinarily flat surface 14a of the semiconductor substrate 14 as the reference plane. Therefore, alignment work for correct coupling of the optical device 15 with a large number of light-detecting elements 11 can be done more easily than before.

In the fourth embodiment, because the light-detecting elements 11 are accommodated in the recess 30, the use of the spacer 34 can be obviated.

<Embodiment 5>

Figure 13:
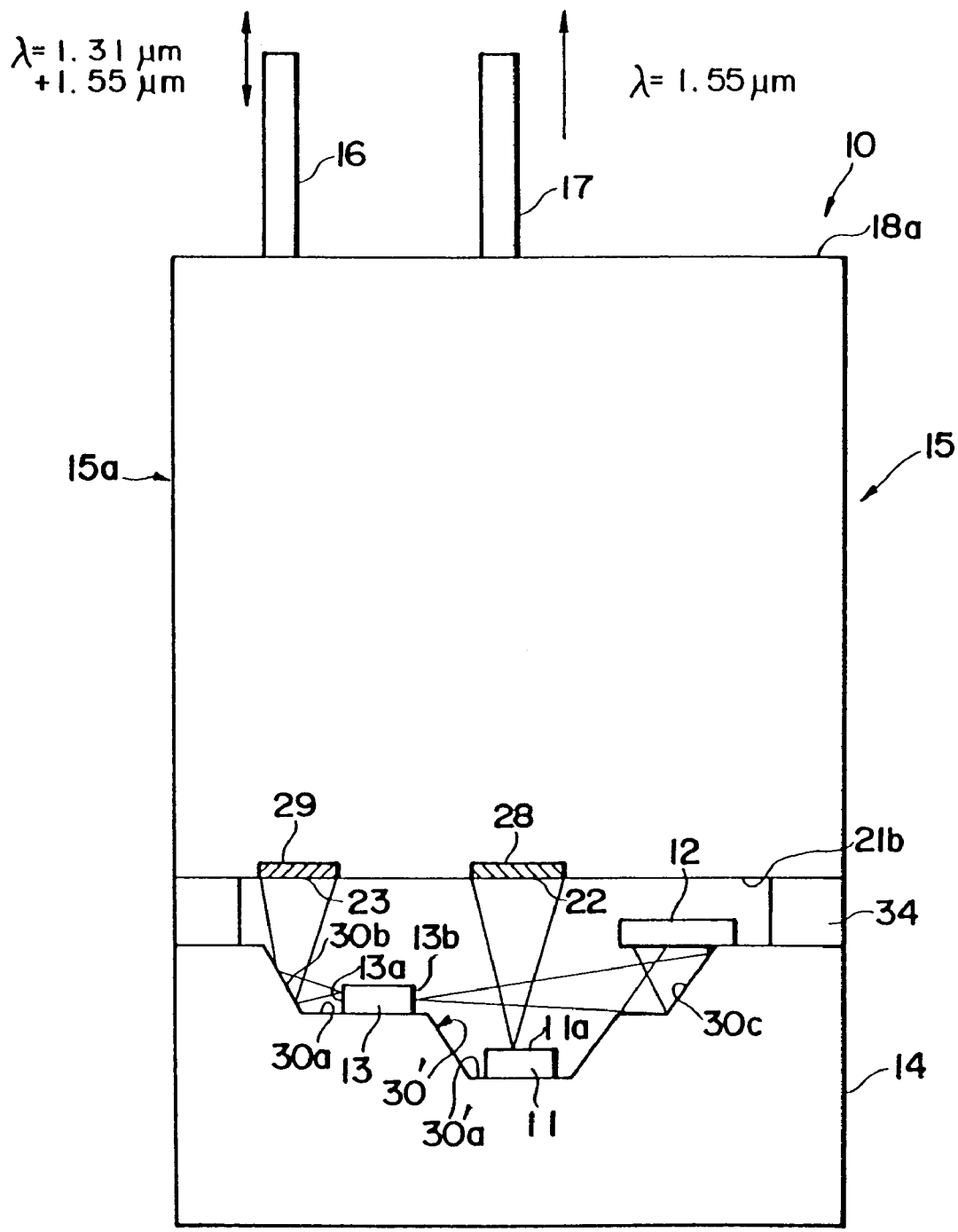
FIG. 13 is a longitudinal sectional view schematically showing a fifth embodiment of the optical coupling module according to the present invention.
Figure 14:
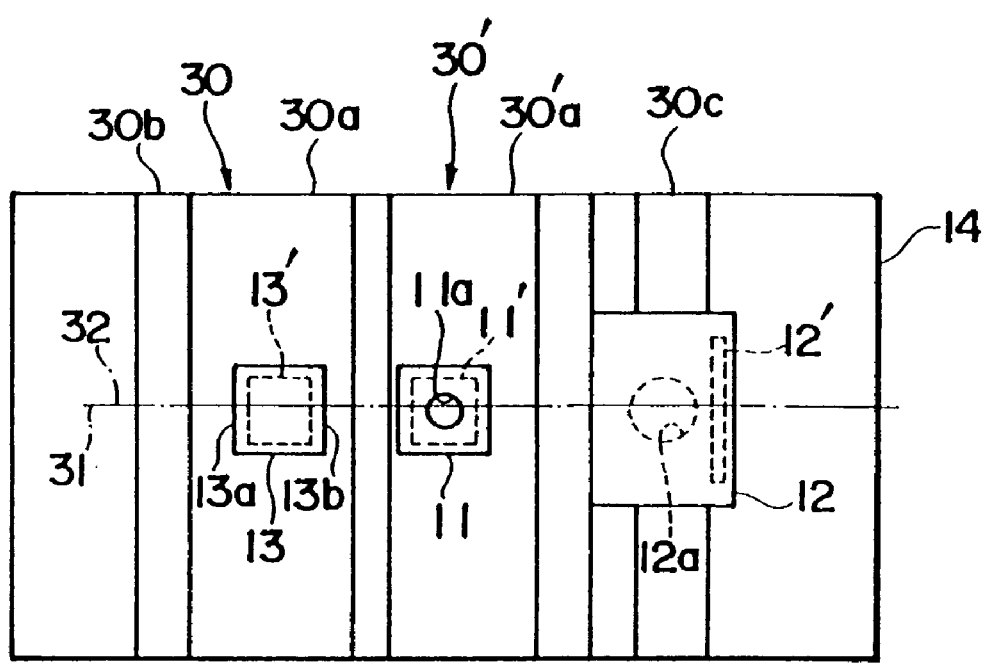
FIG. 14 is a plan view showing the semiconductor substrate and the optical functional elements of the optical coupling module shown in FIG. 13.

In the optical coupling module 10 in a fifth embodiment shown in FIGS. 13 and 14, the light-detecting element 11 and the light-emitting element 13 are arranged in a straight line so as to be on the optical axis 31 of the light-emitting element in accordance with the positional relation of the second output terminal 22 and the second input terminal 23 of the optical device 15.

As evident from FIG. 13, at the surface 14a of the semiconductor substrate 14, there is formed a first recess 30 that is wide open at the surface 14a, and furthermore a second recess 30' with an open area smaller than the recess 30 is formed at the center of the bottom surface 30a of the recess 30.

The light-detecting element 11 is fixed to the bottom surface 30a' of the second recess 30 so as to be accommodated in the second recess 30' with its light detection face 11a facing the second output terminal 22.

The light-emitting element 13 is arranged in a region exclusive of the second recess 30' at the bottom surface 30a of the recess 30. The light-detecting elements 11 and 12 and the light-emitting element 13 are arranged in a straight line along the optical axis 31 of the light-emitting element 13 such that a laser beam from the one light emission face 13a of the light-emitting element 13 is directed to the second input terminal 23 via the inclined side wall 30b of the recess 30 and that a laser beam from the other light emission face 13b is directed to the monitoring light-detecting element 12 via the other inclined side wall 30c of the recess 30 as shown in FIG. 14. The optical axis 31 of the light-emitting element 13 coincides with a projected line 32 of a center line connecting the centers of the second output terminal 22 and the second input terminal 23 of the optical device 15.

In the example of FIG. 13, the light directed from the light-emitting element 13 to the monitoring light-detecting element 12 and the light directed from the second output terminal 22 to the light detection face 11a of the light-detecting element 11 intersect each other, but this intersection of lights is partial, and there is no substantial effect of the intersection of lights on the destinations of projection.

As shown in the fifth embodiment, because the light-detecting element 11 is placed in the second recess 30' in the recess 30, the light-detecting elements 11, 12 and the light-emitting element 13 can be aligned in a straight line along the above-mentioned projected line 32, leaving no chances of the light from the light-emitting element 13 being obstructed by the light-detecting element 11.

Therefore, the optical path can be set without providing an angle of torsion between the projected line 32 of a center line connecting the centers of the second output terminal 22 and the second input terminal 23 and the optical axis 31 of the light-emitting element 13. In consequence, the optical design can be made simple.

Also in the example of the fifth embodiment, the electrodes 11', 12' and 13' for the respective elements may be used as the alignment marks indicating the specified positions of the light-detecting elements 11, 12 and the light-emitting element 13, though they are not illustrated.

Like in other embodiments, those parts which do not function as the electrodes may be formed by using a material for electrodes and by the same electrode forming method simultaneously with the formation of the actual electrodes, so that those parts can be used as the alignment marks.

<Embodiment 6>

Figure 15:
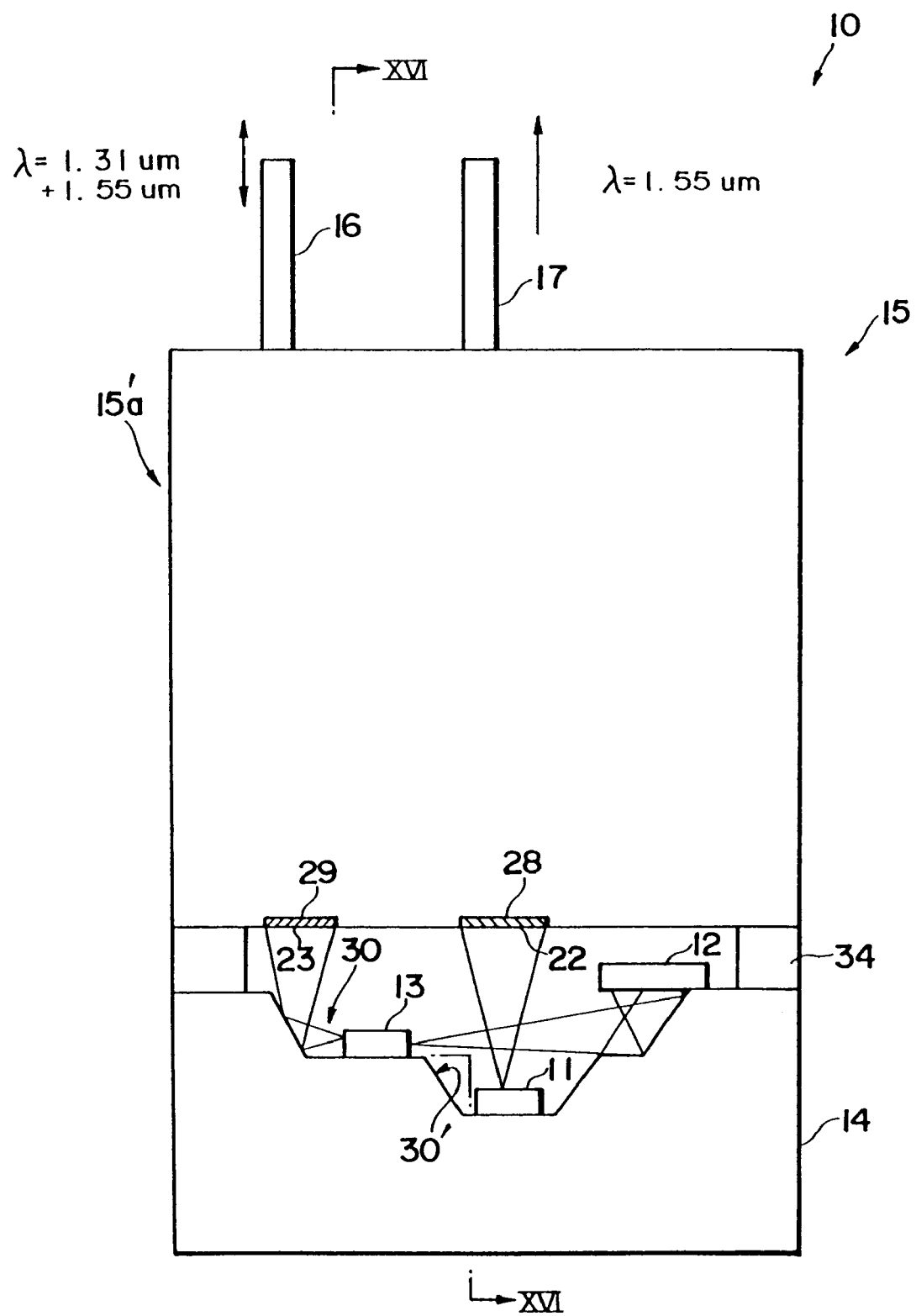
FIG. 15 is a longitudinal sectional view schematically showing a sixth embodiment of the optical coupling module according to the present invention.
Figure 16:
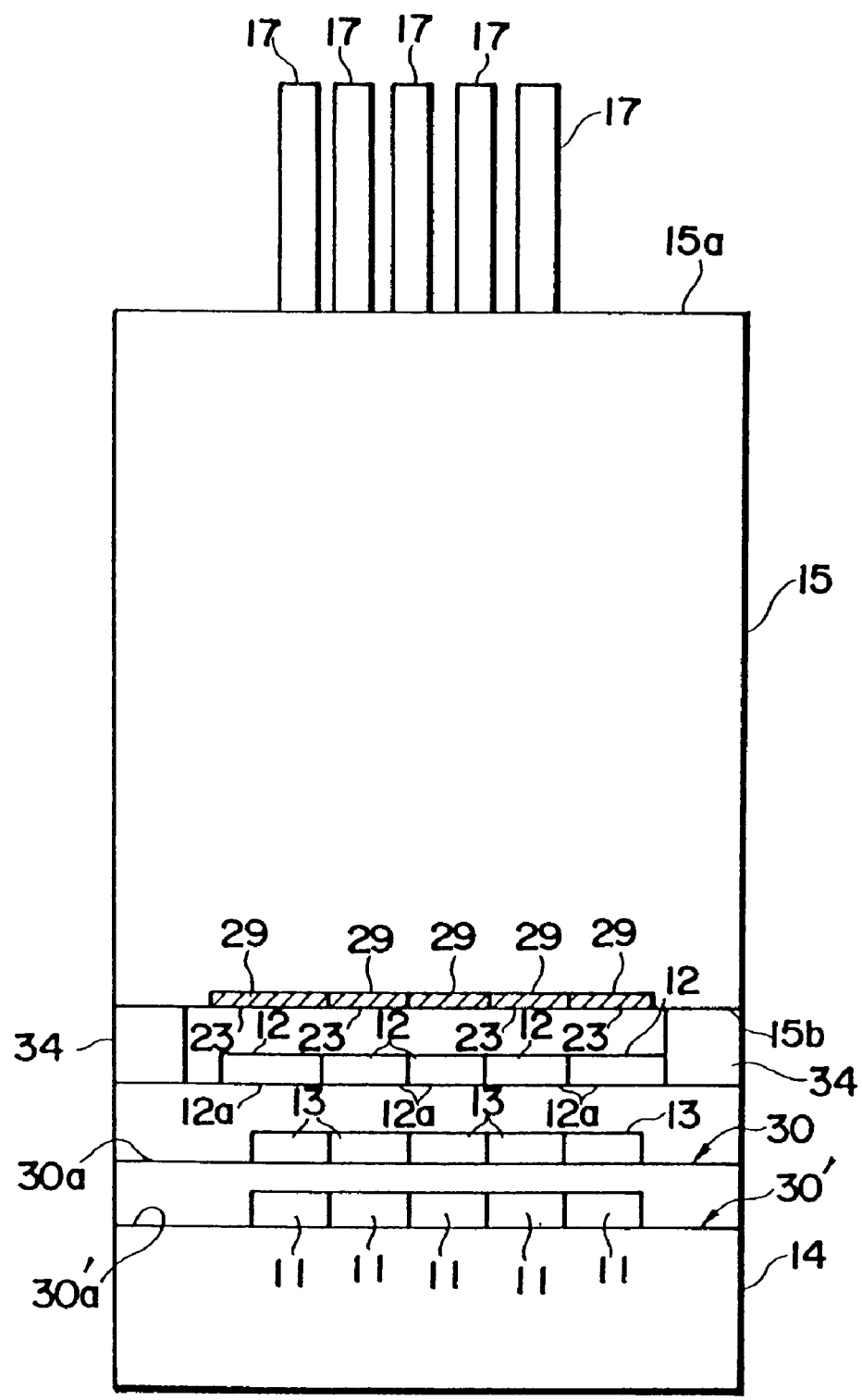
FIG. 16 is a sectional view taken along line XVI—XVI shown in FIG. 15.
Figure 17:
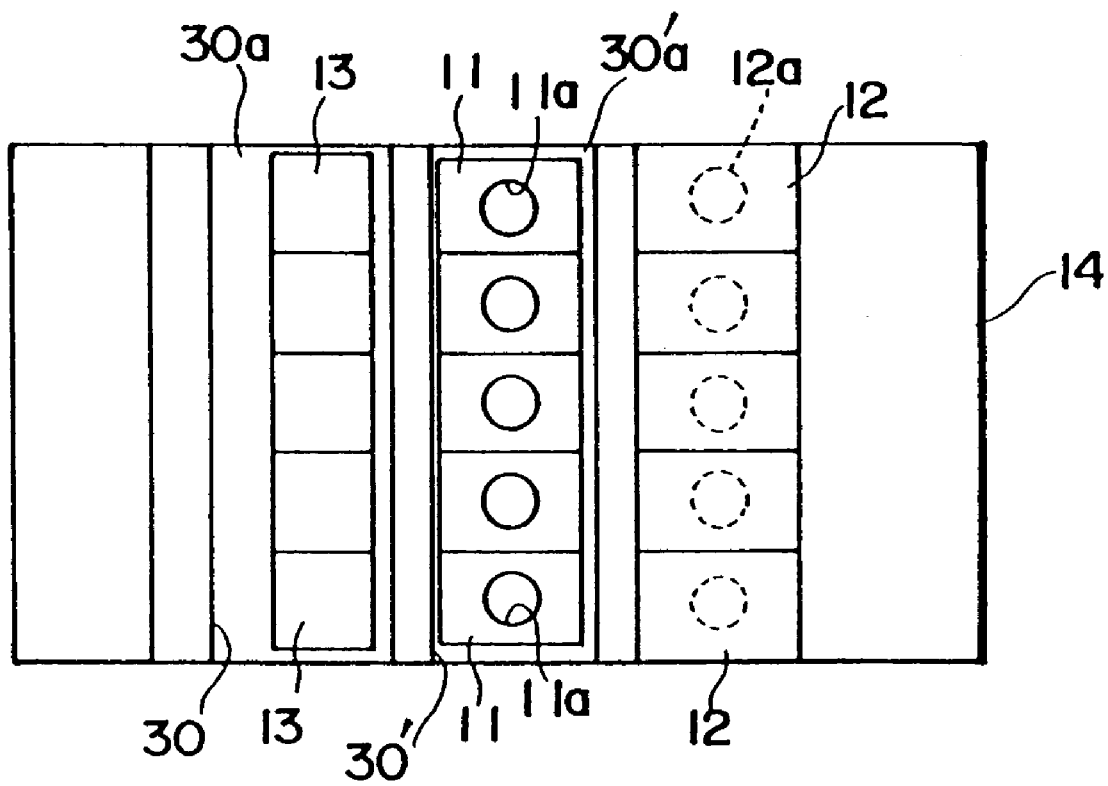
FIG. 17 is a plan view showing the semiconductor substrate and the optical functional elements of the optical coupling module shown in FIG. 15.

FIGS. 15 to 17 show an example in which the optical functional module 10 having the second recess 30' shown in the fifth embodiment is applied to a multi-port type module using a large number of first input terminals 16 and a large number of first output terminals 17.

As shown in FIG. 16, an lens array of a large number of fifth CGH elements 29, which define the second input terminals 23, are formed at the other end of the multi-layer structure 15a' so that the CGH elements 29 correspond to a large number of first input terminals 16 provided on one end of the multi-layer structure of the optical device 15. At the other end of the multi-layer structure 15a', there are formed a lens array of fourth CGH elements 28 (not shown) for the second output terminals 22 so as to correspond to a large number of first output terminals 17.

The light-detecting elements 11, the monitoring light-detecting elements 12, and the light-emitting elements 13 are arranged respectively in large numbers to correspond to the lens arrays as shown in the third embodiment. As shown in FIG. 17, out of the light-detecting elements 11 and 12, the light-detecting elements 11 are aligned on the bottom surface 30a' of the second recess 30'. Furthermore, the light-emitting elements 13 are aligned on the bottom surface 30a of the first recess 30.

In a multi-port type module such as this, many light-detecting elements 11 and 12, and light-emitting elements 13 are arranged regularly. The use of electrodes as the alignment marks as described is particularly effective in aligning the elements. By using the electrodes as the alignment marks for those elements, alignment can be done by passive alignment, which facilitates the alignment of the elements.

<Embodiment 7>

A composite plate may be used for the semiconductor substrate on which the optical functional elements 11, 12 and 13 are mounted.

Figure 18:
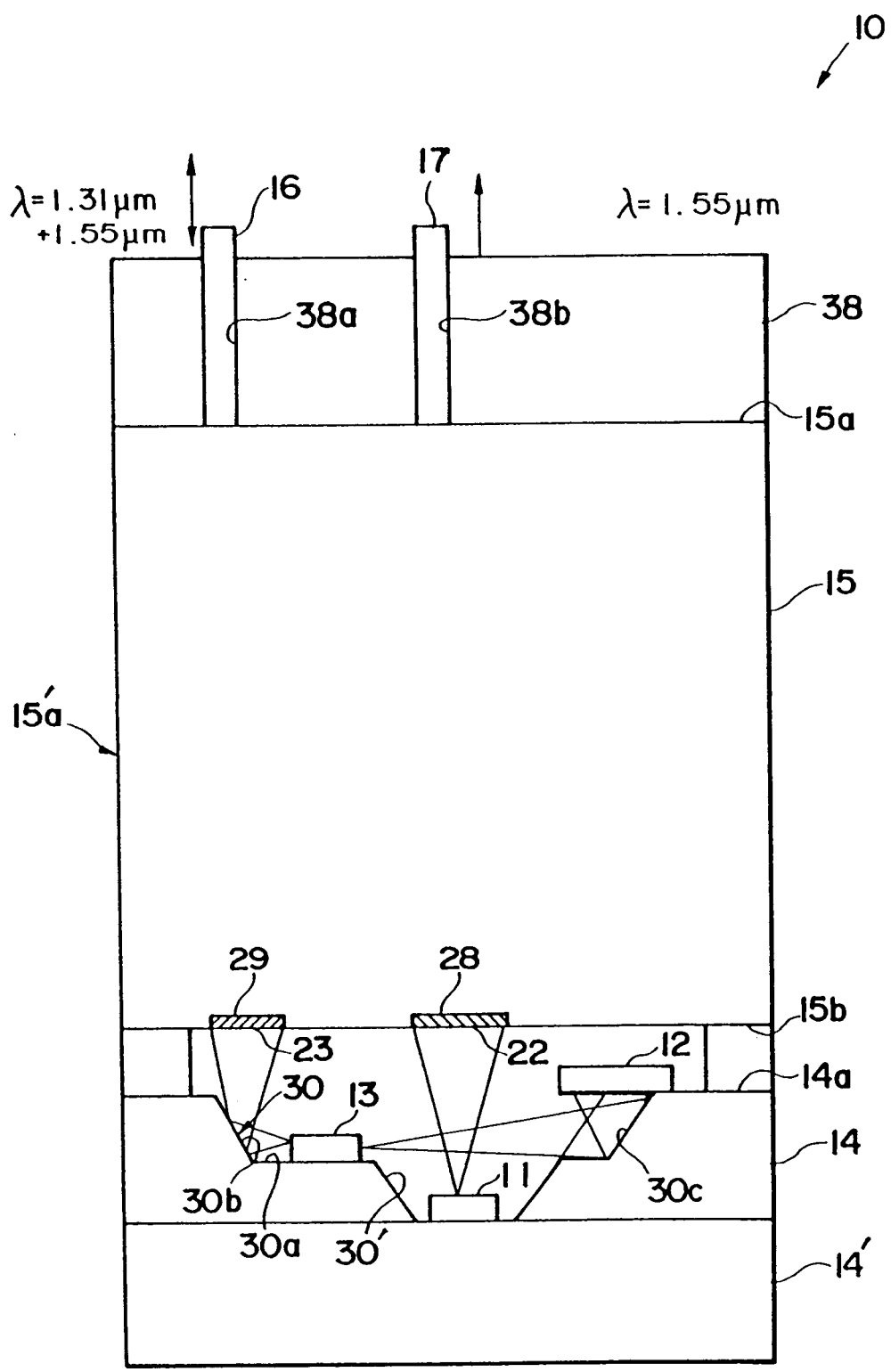
FIG. 18 is a longitudinal sectional view schematically showing a seventh embodiment of the optical coupling module according to the present invention.
Figure 19:
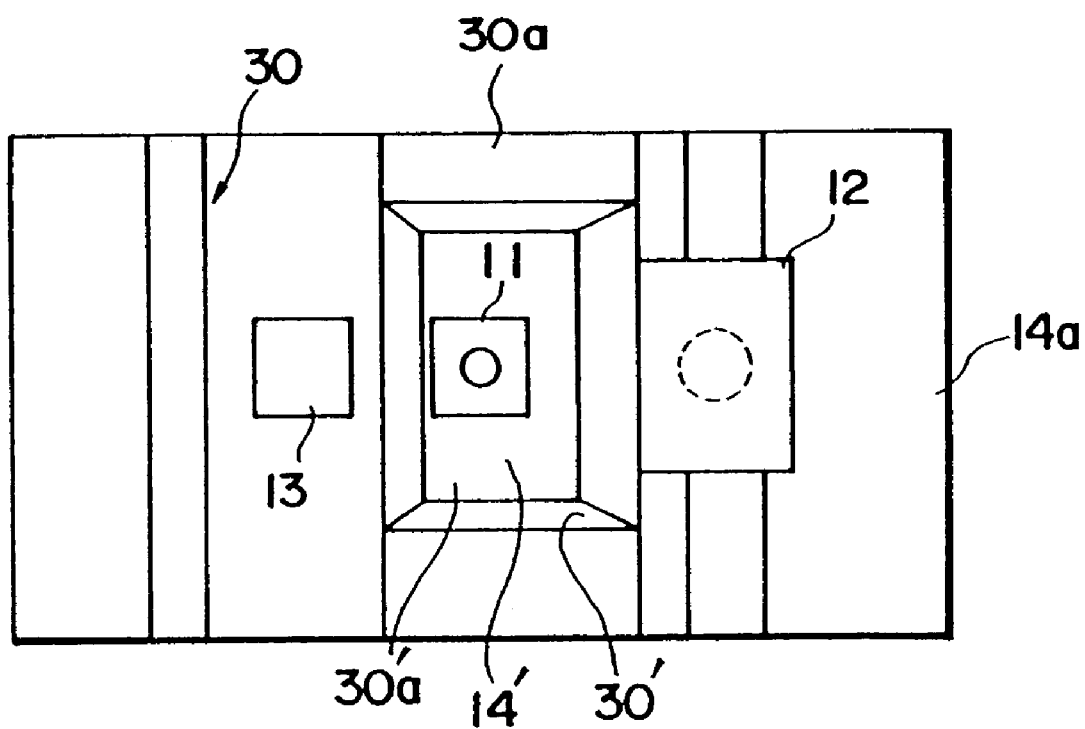
FIG. 19 is a plan view showing the composite substrate and the optical functional elements of the optical coupling module shown in FIG. 18.

In the optical coupling module 10 in a seventh embodiment shown in FIGS. 18 and 19, a composite substrate (14 and 14') can be used which is formed by laminating a semiconductor substrate 14 and an insulating substrate 14' formed of a silicate material such as ceramics or glass.

In the illustrated example, a semiconductor substrate 14 is used for the upper substrate where the first recess 30 and the second recess 30' are formed, and an insulating substrate 14' is used for the lower substrate, which is bonded to the lower surface of the upper substrate. In this example, the second recess 30', provided at the bottom surface 30a of the first recess 30 of the semiconductor substrate 14, is formed by boring through the semiconductor substrate 14 in the thickness direction. Accordingly, the insulating substrate 14' as the lower substrate is exposed at the bottom surface 30a' of the second recess 30', and on the exposed area the light-detecting element 11 is disposed.

The semiconductor substrate 14, such as silicon, has a higher thermal conductivity than that of a ceramic plate or a glass plate, and therefore exhibits a higher heat radiation property. Hence, to prevent an unstable operation due to an rise in temperature of the light-emitting element 13, such as a semiconductor laser, arranged on the substrate, the upper substrate for mounting the light-emitting element 13 is preferably composed of the semiconductor substrate 14.

The semiconductor substrate is capable of being etched to form the recesses 30 and 30' and is superior in workability to a ceramic plate or a glass plate which needs to be ground or cut to form the recesses 30 and 30'.

On the other hand, the insulating substrate 14', such as a ceramic plate or a glass plate, has a smaller electric charge capacity than the semiconductor substrate 14. Therefore, when high-speed pulses are produced by the light-emitting element 13, a driving circuit (not shown) is mounted on the substrate, and in this case the electric charge capacity of the substrate side is preferably reduced to increase the driving speed of the driving circuit. In this respect, it is desirable to use a ceramic plate or a glass plate.

A composite substrate (14 and 14') composed of a semiconductor substrate 14 and an insulating substrate 14', such as a ceramic plate or a glass plate, having the respective advantages, is most desirable. It is also possible to use the semiconductor substrate 14 for the lower substrate and the insulating substrate 14' for the upper substrate, but as described above, it is desirable to use the semiconductor substrate for the upper substrate to have the substrate surface formed by the semiconductor substrate 14 from the viewpoint of making effective use of the above-mentioned advantages.

The bottom surface 30a' of the second recess 30' may be formed by a thin-walled portion (not shown) of the semiconductor substrate 14.

When the first recess 30 and the second recess 30' of the semiconductor substrate 14 are formed by etching, it is desirable to form the first recess 30 after the second recess 30' has been formed.

This is because the inclined surfaces 30b and 30c of the first recess 30 are used to reflect the rays from the light-emitting element 13 and the accuracy of the first recess 30 has considerable effects on the optical characteristics.

Therefore, if the effects of the etching process for the second recess 30' are to be eliminated after the first recess 30 was formed by etching with high accuracy, it becomes necessary to apply partial masking on the region including the inclined surfaces 30b and 30c of the first recess 30.

In contrast, as described above, if the first recess 30 is formed after the second recess 30' was formed, which does not require high accuracy as in the first recess 30, it is possible to suitably form the second recess 30' without using masking and the high-accuracy first recess 30, respectively by etching.

As shown in FIG. 18, at the end face 15a of the multi-layer structure 15a' of the optical device 15, it is possible to provide a fiber connection plate 38 formed by a ceramic plate or a glass plate, for example, which has connection holes 38a and 38b, each accepting an optical fiber as the first input terminal 16 and an optical fiber as the first output terminal 17.

By fixing the optical fibers to the fiber connection plate 38 after the optical fibers (16 and 17) were inserted into the prearranged connection holes 38a and 38b of the fiber connection plate 38, the fibers (16 and 17) and the multi-layer structure 15a' can be connected together correctly and easily.

The composite substrate and the fiber connection plate mentioned above can be applied to the above-mentioned multi-port type optical coupling module 10.

In the following embodiments, description will be made of cases where the optical device 15, which has a multi-layer structure 15a' generally in the shape of a rectangular parallelepiped, is mounted to the semiconductor substrate 14 such that the laminated direction of the multi-layer structure 16a' is placed in the horizontal direction.

<Embodiment 8>

Figure 20:
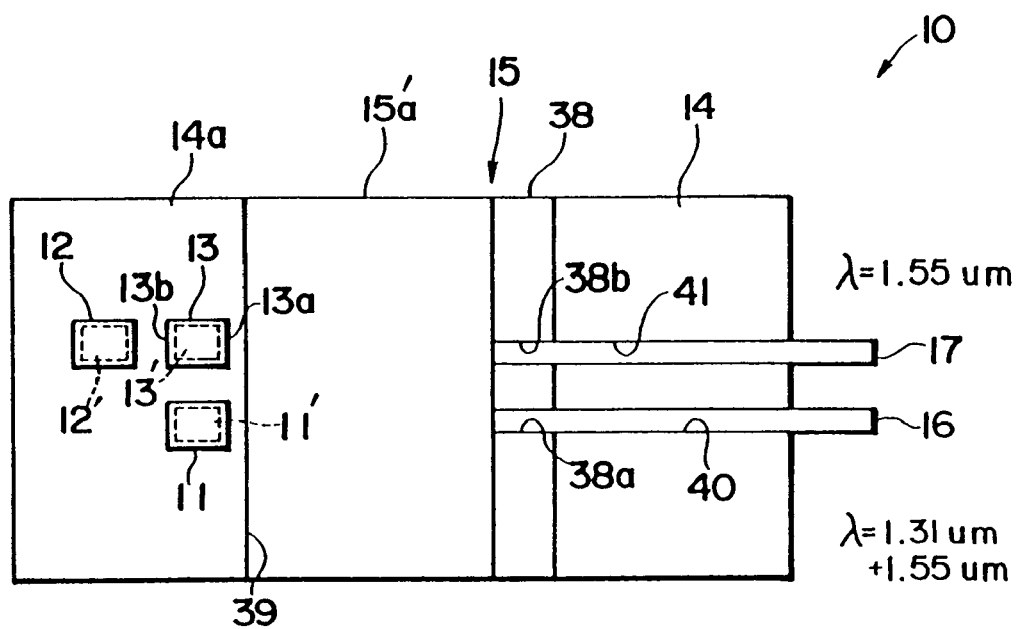
FIG. 20 is a plan view schematically showing an eighth embodiment of the optical coupling module according to the present invention.
Figure 21:
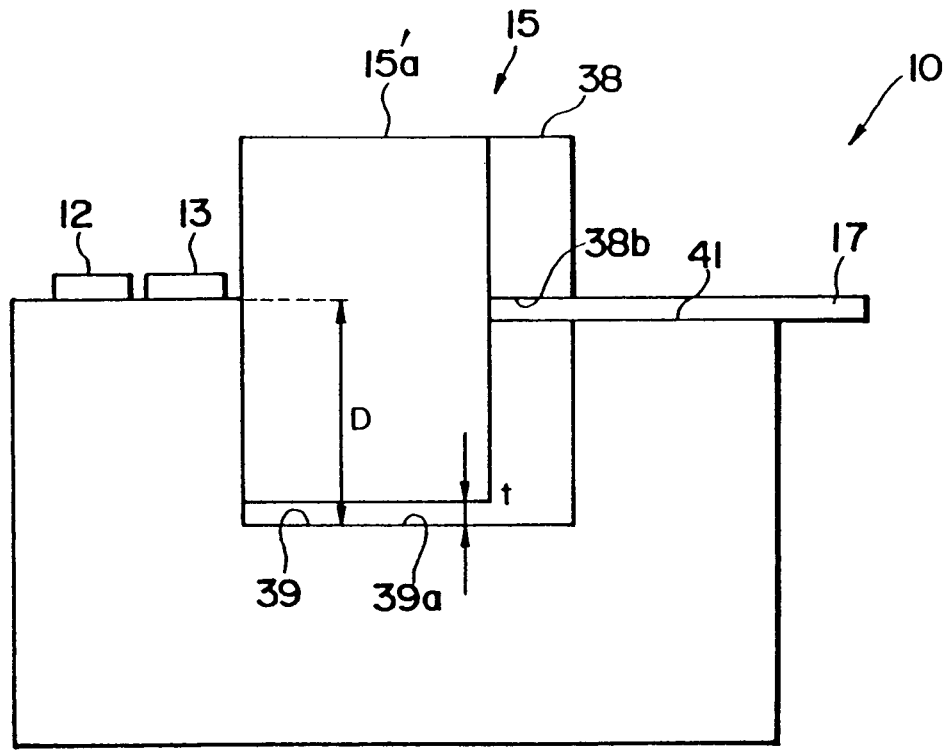
FIG. 21 is a longitudinal sectional view schematically showing the optical coupling module shown in FIG. 20.

In the optical coupling module 10 in an eighth embodiment, as shown in FIGS. 20 and 21, the semiconductor substrate 14 on which the optical device 15 is mounted includes a recess 39, which is open at the upper end and defines a generally rectangular empty space in the substrate. The recess 39 has a depth D from the surface 14a of the semiconductor substrate 14 as shown in FIG. 21.

The multi-layer structure 15a' of the optical device 15, formed just as has been described, is at one side accommodated in the recess 39 by being inserted sideways, that is, with its laminated direction extending at right angles with the depth direction of the recess 39.

The optical fiber that forms the first input terminal 16 and the optical fiber that forms the first output terminal 17 described above are respectively connected through the fiber connection plate 38 to one end of the multi-layer structure 15a'. In the eighth embodiment, the fiber connection plate 38 is accommodated into the recess 39 as one body with the multi-layer structure 15a'.

At one side of the surface 14a of the semiconductor substrate 14, there are formed grooves 40 to accommodate and thereby position the optical fibers 16 and 17 extending from one end of the multi-layer structure 15a'.

The optical fibers 16 and 17 extend along the grooves 40 and 41 and protrude beyond the end face of the semiconductor substrate 14.

At the other side of the surface 14a of the semiconductor substrate 14, the light-detecting element 11, the monitoring light-detecting element 12 and the light-emitting element 13 described above are mounted so as to correspond to the second output terminal 22 and the second input terminal 23 provided at the other end of the multi-layer structure 15a'.

The elements 11, 12 and 13 are positioned by using the electrodes 11', 12' and 13' as the alignment marks such that the optical fibers 16 and 17 are accommodated in the grooves 40 and 41 and that the light-detecting element 11 and the light-emitting element 13 are optically coupled correctly to the output terminal 22 and the input terminal 23 of the optical device 15 and that the light-detecting element 12 and the light-emitting element 13 are optically coupled to each other correctly when the multi-layer structure 15a' of the optical device 15 is accommodated correctly into the recess 39.

The electrodes 11', 12' and 13' as the alignment marks for the elements 11, 12 and 13 can be formed by depositing a metal film (not shown), for forming the electrodes on the other side of the surface 14a of the semiconductor substrate 14, and then by selective etching on the metal film with a mask to thereby remove the unwanted portions of the metal film.

The mask for forming the grooves 40 and 41 may be integrally formed with the lithographic and etching masks for forming the electrodes when the lithographic and etching masks are created.

By selective etching by using this single mask, the electrodes 11', 12' and 13' as the alignment marks and the grooves 40 and 41 may be formed. By those steps, the optical device 15 positioned by the grooves 40 and 41 and the light-detecting element 11 and the light-emitting element 13 optically coupled to the optical device 15 can be positioned with respect to each other with extremely high accuracy within allowable errors of photolithography. Furthermore, the light-emitting element 13 and the monitoring light-detecting element 12 can be positioned with respect to each other with high accuracy.

Consequently, optical passive alignment as mentioned above becomes possible.

To facilitate accurate mounting of the optical device 15 to the semiconductor substrate 14, the depth D of the recess 39 is preferably set such that the first input terminal 16 and the first output terminal 17 are accommodated in the grooves 40 and 41 and that an adequate clearance t is provided between the bottom surface 39a of the recess 39 and the side face of the multi-layer structure 15a' which faces the bottom surface when the multi-layer structure 15a' of the optical device 15 is suitably accommodated in the recess 39.

An adequate depth D can be secured by setting the clearance between the side face of the multi-layer structure 15a' which faces the bottom surface 39a of the recess 39 and the optical fiber 16 or 17 so that the clearance is smaller than the distance from the bottom of the groove to the bottom surface of the recess.

<Embodiment 9>

Figure 22:
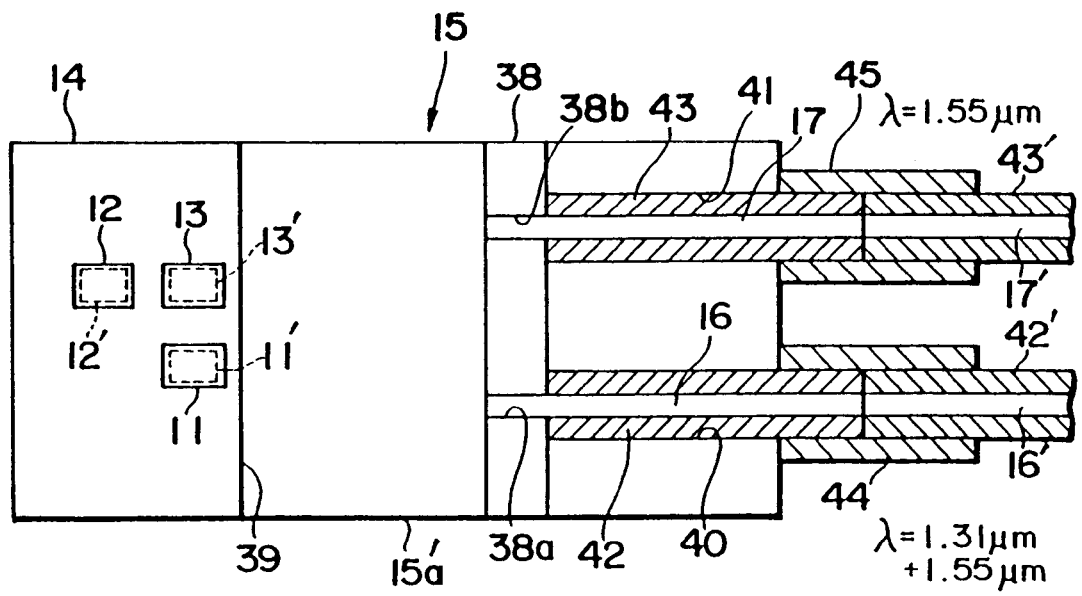
FIG. 22 is a plan view schematically showing a ninth embodiment of the optical coupling module according to the present invention.
Figure 23:
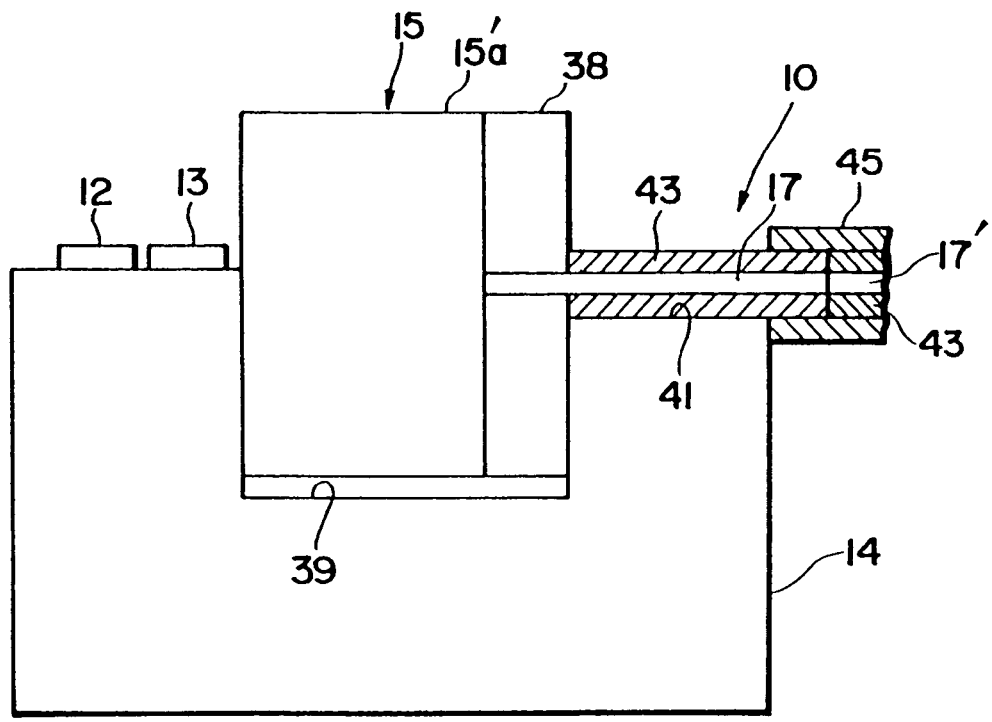
FIG. 23 is a sectional view schematically showing the optical coupling module shown in FIG. 22.

FIGS. 22 and 23 show an example where such a receptacle structure is used which detachablly connects the optical fibers (16' and 17') at the first input terminal 16 and the first output terminal 17.

Ferrules 42 and 43 for protection of the optical fibers are attached to the optical fibers 16 and 17 which form the first input terminal 16 and the first output terminal 17 of the optical coupling module 10. For this reason, the grooves 40 and 41 provided at the surface 14a of the semiconductor substrate 14 have greater cross sections than in the eighth embodiment so as to accept the optical fibers 16 and 17 through the intermediary of the ferrules 42 and 43.

The ferrules 42 and 43 protrude beyond the one side of the semiconductor substrate 14 respectively integrally with the inserted optical fibers 16 and 17. The splicing ends of the optical fiber circuits, in other words, the leading ends of the optical fibers 16' and 17' along with the protective ferrules 42' and 43' are connected to the above-mentioned protruding ends. The optical fibers 16 and 17 and the optical fibers 16' and 17' are removably connected by covering-sleeves 44 and 45.

The optical fibers 16 and 17 and the optical fibers 16' and 17' can be unremovably, or fixedly connected by means of the sleeves 44 and 45 by applying an adhesive or the like.

In any case, after the optical device 15 has been mounted to the semiconductor substrate 14, by connecting the optical fiber circuits to the optical device 15 through the above-mentioned receptacle structure, the optical coupling module 10 becomes easy to handle. By the adoption of the receptacle structure, it becomes relatively easy to connect the optical fiber circuits to the optical device 15.

<Embodiment 10>

Figure 24:
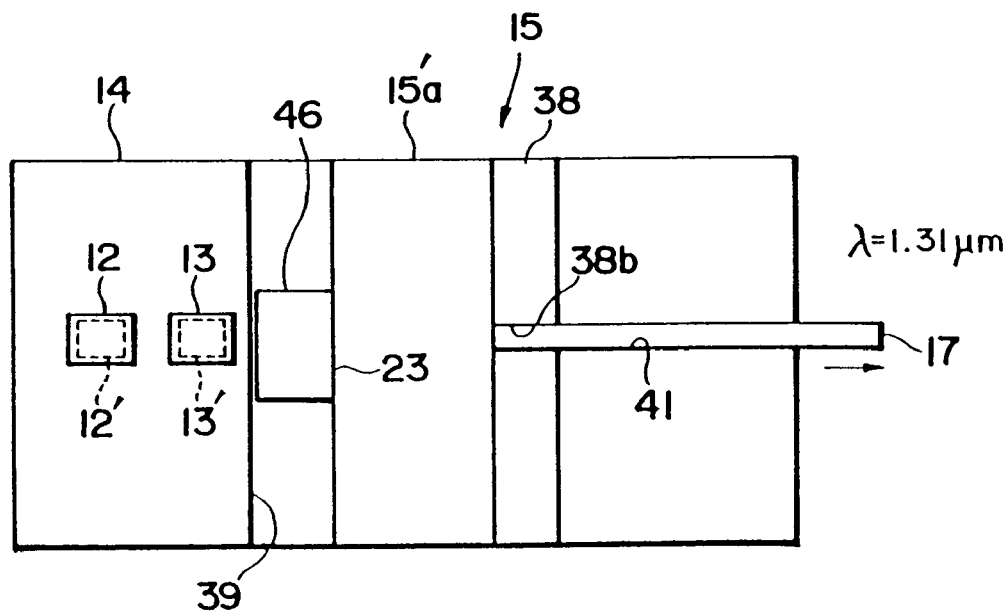
FIG. 24 is a plan view schematically showing a tenth embodiment of the optical coupling module according to the present invention.
Figure 25:
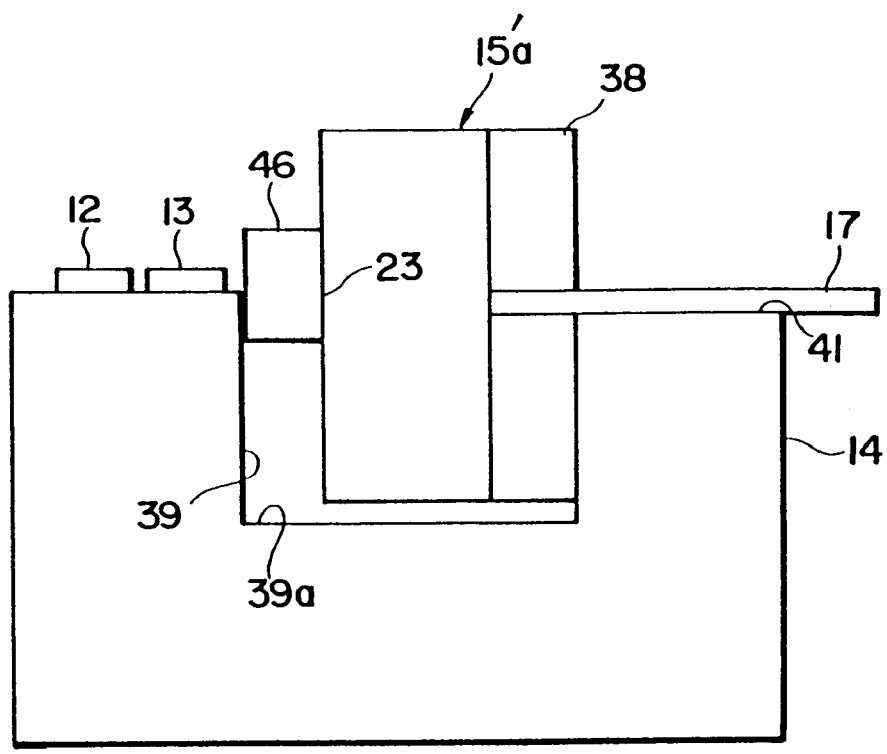
FIG. 25 is a sectional view schematically showing the optical coupling module shown in FIG. 24.

As shown in FIGS. 24 and 25, an optical nonreciprocity element 46 can be inserted between the optical device 15 and the semiconductor laser 13 as the light-emitting element. An optical coupling module 10 shown in a tenth embodiment is a sending only module that includes a semiconductor laser as the light-emitting element 13 and a monitoring light-detecting element 12, but without a light-detecting element 11 for reception.

The optical fiber 17 for the output terminal accommodated in the groove 41 like the one formed in the semiconductor substrate 14 is connected to one end of the multi-layer structure 15a' of the optical device through the intermediary of the fiber connection plate 38. An optical nonreciprocity element 46, such as a well-known isolator is attached to the other end of the multi-layer structure 15a' so as to correspond to the input terminal 23 formed at the other end like the one that has been described. This optical nonreciprocity element 46 is accommodated in the recess 39 of the semiconductor substrate 14 as one body with the multi-layer structure 15a'.

The isolator 46 as an optical nonreciprocity element prevents the laser beam emitted by the semiconductor laser to the input terminal 23 of the optical device 15 from returning to the semiconductor laser 13, so that the semiconductor laser 13 can be operated stably.

For this nonreciprocity element 46, a circulator can be used. For the optical coupling module 10 in the tenth embodiment, the same receptacle structure as has been described in the ninth embodiment may be used.

In addition, the optical nonreciprocity element 46 shown in the tenth embodiment may be applied to the optical coupling modules 10 in the eighth and ninth embodiments to enable the semiconductor laser to operate stably.

Description has been made of the cases where the CGH elements are mainly used as the optical elements in the optical device 15. However, various optical elements, such as a bulk lens or a refractive index profile lens, may be adopted for the optical device 15.

However, preferably, the CGH elements mentioned above should be used for a compact structure and a high density integration of high-precision optical systems.

According to the present invention, as described above, the optical device is optically coupled to the functional elements on the semiconductor substrate, and to support the optical device, the mirror-finished flat surface of the semiconductor substrate is used. Therefore, in aligning the optical device on the semiconductor substrate, the optical device can be positioned at right position relatively easily by fine adjustment of the optical device along the flat surface. Thus, the alignment work becomes far easier than before, and it is possible to provide less expensive optical coupling modules.

According to the present invention, as described above, it is possible to easily and efficiently manufacture a large number of optical coupling modules by the steps of:

mounting a large number of the optical functional elements in high density on a semiconductor wafer as an aggregate of the semiconductor substrates;

forming in high density a plurality of the optical devices in the form of a multi-layer structure including a plurality of the optical substrates including the optical elements;

then collectively joining the semiconductor wafer with the multi-layer structure of the optical substrates such that the optical functional elements on the semiconductor wafer are optically coupled respectively to the optical elements on the multi-layer structure corresponding to the optical functional elements, thereby forming optical coupling modules in high density; and separating a plurality of optical coupling modules formed in high density into individual modules, wherein it becomes possible to manufacture a large number of optical coupling modules.

According to the present invention, as described above, by using a single mask, the grooves for accepting optical fibers that form the input terminal and the output terminal of the optical device and also the alignment marks for the optical functional elements to be coupled to the optical device are formed on the semiconductor substrate that has formed therein the recess into which the multi-layer structure of the optical device is inserted sideways. By the adoption of this method, passive alignment with high accuracy becomes possible, so that it is possible to provide optical coupling modules relatively easily and at low cost.

What is claimed is:

1. An optical coupling module, comprising:
   a semiconductor substrate having a mirror-finished surface and having mounted on said mirror-finished surface an optical functional element with an optical functional surface kept substantially parallel with said mirror-finished surface and with a reverse surface, opposite said optical functional surface, facing said mirror-finished surface; and
   an optical device, supported on said mirror-finished surface of said semiconductor substrate in such a way that said optical device is optically coupled to said optical functional element,
   wherein a set of alignment marks to indicate an optimum position for optical coupling is provided on both said mirror-finished surface of said semiconductor substrate and an end face of said optical device facing said mirror-finished surface of said semiconductor substrate.

2. An optical coupling module according to claim 1, wherein a recess for accommodating said optical functional element is formed in said semiconductor substrate, and wherein said optical functional element accommodated in said recess is a light-detecting element whose optical functional surface is used as a light detection face.

3. An optical coupling module according to claim 2, wherein said recess is formed by etching on said mirror-finished surface of said semiconductor substrate.

4. An optical coupling module according to claim 2, wherein a plurality of light-detecting elements are aligned with one another, and wherein said light-detecting elements are optically coupled respectively to said optical device.

5. An optical coupling module according to claim 2, further comprising an end face emission type light-emitting element which is mounted on said semiconductor substrate and which is optically coupled to said optical device, wherein said end face emission type light-emitting element has a light emission face at least at one end thereof.

6. An optical coupling module according to claim 5, wherein alignment marks for positioning said light emission and said light-detecting element are provided on the bottom surface of said recess.

7. An optical coupling module according to claim 6, wherein said alignment marks are electrodes for said optical functional element, formed on said semiconductor substrate by photolithography.

8. An optical coupling module according to claim 5, wherein said light-emitting element is arranged with said light emission face directed to one of a pair of inclined side walls in said recess, and wherein at least a part of said one side wall defines a reflection face to guide a ray from said light emission face to said optical device.

9. An optical coupling module according to claim 8, further comprising a monitoring light-detecting element, arranged on said semiconductor substrate, for monitoring night emission from said light-emitting element, wherein said light-emitting element has at the other end an auxiliary light emission face, and wherein at least a part of the other side wall of said recess defines a reflecting face to guide a ray emitted from said auxiliary light emission face of said light-emitting element to said monitoring light-detecting element.

10. An optical coupling module according to claim 8, wherein said optical device has on one end face a first input terminal and a first output terminal, said first input terminal receiving multiplexed light having component beams of different wavelengths and said first output terminal outputting a beam of a first wavelength component separated from said multiplexed light received from said first input terminal, wherein said optical device has on the other end face a second input terminal and a second output terminal to enable bi-directional communications by directing a second wavelength beam component separated from said multiplexed light to said first input terminal, and wherein said optical device is supported by said semiconductor substrate with said one end face facing said mirror-finished surface of said semiconductor substrate such that said second input terminal and said second output terminal respectively correspond to said light emission face and said light detection face of said light-emitting element and said light-detecting element.

11. An optical coupling module according to claim 10, wherein a set of alignment marks are attached to one end face of said optical device and to said mirror-finished surface of said semiconductor substrate, said set of alignment marks showing an aligned position where said second input terminal and said second output terminal correspond to said light emission face and said light detection face of said light-emitting element and light-detecting element.

12. An optical coupling module according to claim 10, wherein said optical device includes a multi-layer substrate formed by laminating a plurality of optical substrates including computer generated holograms as said optical elements.

13. An optical coupling module according to claim 5, wherein said recess is a first recess, and a second recess is formed at the bottom surface of said first recess, said second recess having a smaller open area than the open area of said first recess, and wherein said light-detecting element is arranged in said second recess.

14. An optical coupling module according to claim 13, wherein said light-emitting element is arranged at the bottom surface of said first recess exclusive of the area of said second recess, and wherein said light-detecting element in said second recess is aligned with said light-emitting element along the optical axis of said light-emitting element.

15. An optical coupling module according to claim 13, wherein said semiconductor substrate forms a part of the composite substrate having a multi-layer structure whose surface is defined by said semiconductor substrate, and wherein said first recess is formed in said semiconductor substrate and an opening for said second recess is formed at the bottom surface of said first recess.

16. An optical coupling module according to claim 1, wherein said semiconductor substrate forms a part of a composite substrate having a multi-layer structure whose surface is defined by said semiconductor substrate.

17. An optical coupling module according to claim 16, wherein said composite substrate is formed by said semiconductor substrate and a glass plate bonded to the reverse surface of said semiconductor substrate.

18. An optical coupling module according to claim 16, wherein said composite substrate is formed by said semiconductor substrate and a ceramic plate bonded to the reverse surface of said semiconductor substrate.

19. A method of manufacturing an optical coupling module, having a semiconductor substrate having a mirror-finished surface and having mounted on said mirror-finished surface an optical functional element with an optical functional surface kept substantially parallel with said mirror-finished surface and with a reverse surface, opposite said optical functional surface, facing said mirror-finished surface; and an optical device, supported on said mirror-finished surface of said semiconductor substrate in such a way that said optical device is optically coupled to said optical functional element, said manufacturing method comprising the steps of:

mounting a large number of said optical functional elements in high density on a semiconductor wafer as an aggregate of said semiconductor substrates;

forming in high density a plurality of said optical devices in the form of a multi-layer structure including a plurality of said optical substrates including said optical elements;

then collectively joining said semiconductor wafer with said multi-layer structure of the optical substrates such that said optical functional elements on said semiconductor wafer are optically coupled respectively to said optical elements on said multi-layer structure corresponding to said optical functional elements, thereby forming optical coupling modules in high density; and separating a plurality of optical coupling modules formed in high density into individual modules.

20. An optical coupling module comprising:

an optical device formed as a multi-layer structure by laminating a plurality of optical substrates including at least one computer generated hologram, having at least one optical fiber joined to one end face of said structure, located in the direction of lamination, and having at the other end face thereof an output terminal or an input terminal for a light traveling from said optical fiber and passing through said computer generated hologram;

a semiconductor substrate having a recess formed to accommodate said multi-layer structure of said optical device by being located sideways with the laminated direction thereof extending at right angles with the depth direction, also having a corresponding groove to accept and position said optical fiber formed on one side of the upper surface where the recess is open, and having alignment marks formed on the other side of the upper surface where said recess is open; and an optical functional element arranged at a predetermined position defined by the alignment marks on the upper surface of said semiconductor substrate and optically coupled to the output terminal or the input terminal of said multi-layer structure, wherein said groove and the alignment marks at the upper surface of said semiconductor substrate are formed by photolithography and etching with a single mask.

21. An optical coupling module according to claim 20, wherein said alignment marks are electrodes for said optical elements.

22. An optical coupling module according to claim 20, wherein said recess has a depth large enough to leave a clearance between the bottom surface of said recess and the side face of said multi-layer structure that faces the bottom surface.

23. An optical coupling module according to claim 20, wherein said multi-layer structure is generally in the shape of a rectangular parallelepiped, and wherein the clearance between the side face of said multi-layer structure that faces the bottom surface of said recess when said multi-layer structure is accommodated in said recess and the optical fiber is set at a value smaller than the bottom surface of said recess.

24. An optical coupling module according to claim 20, wherein said optical fiber is connected to said multi-layer structure through a connection plate having hole for accepting the end portion of said optical fiber and fixedly connected to one end of said multi-layer structure, and wherein said connection plate is accommodated in said recess as one body with said multi-layer structure.

25. An optical coupling module according to claim 20, wherein said optical element is a semiconductor laser, and wherein an optical nonreciprocity element is accommodated in said recess as one body with said multi-layer structure, said optical nonreciprocity element preventing the ray from said semiconductor laser from returning to said semiconductor laser.

26. An optical coupling module according to claim 20, wherein a ferrule is fitted on said optical fiber to be accommodated in said groove in said semiconductor substrate, and said groove accommodates said optical fiber through said ferrule.

27. An optical coupling module according to claim 26, wherein said optical fiber and said ferrule covering the optical fiber protrude beyond the end face of said semiconductor substrate of said multi-layer structure.

28. An optical coupling module according to claim 27, wherein said protruding end portion and a sleeve combine to jointly form a detachable receptacle structure, said sleeve accepting at one end said protruding end portion and accepting at the other end an optical fiber to be connected to said protruding end portion and a ferrule to cover said optical fiber to be connected to said protruding end portion.

29. An optical coupling module, comprising:

a semiconductor substrate having a mirror-finished surface and having mounted on said mirror-finished surface an optical functional element with an optical functional surface kept substantially parallel with said mirror-finished surface and with a reverse surface, opposite said optical functional surface, facing said mirror-finished surface; and an optical device, supported on said mirror-finished surface of said semiconductor substrate in such a way that said optical device is optically coupled to said optical functional element, wherein a recess for accommodating said optical functional element is formed in said semiconductor substrate, and wherein said optical function element accommodated in said recess is a light-detecting element whose optical functional surface is used as a light detection face.

30. An optical coupling module according to claim 29, wherein said recess has a bottom and an inclined side wall, and further comprising a light-emitting element which is mounted in said recess and which has a light emission face that is directed to said inclined side wall, said inclined side wall reflecting light from said light-emitting element to said optical device.

31. An optical coupling device according to claim 30, wherein said optical device comprises a laminated stack of substrates including computer-generated holograms to provide optical elements, said stack having a first end with input and output terminals and a second end to which said semiconductor substrate is connected.

32. An optical coupling module, comprising:

a semiconductor substrate having a mirror-finished surface and having mounted on said mirror-finished surface an optical functional element with an optical functional surface kept substantially parallel with said mirror-finished surface and with a reverse surface, opposite said optical functional surface, facing said mirror-finished surface; and a laminated stack of substrates including computer-generated holograms to provide optical elements, said stack having a first end with an optical terminal and a second end to which said semiconductor substrate is connected, with said optical functional element being optically coupled to said second end of said stack, wherein said computer-generated holograms are oriented generally parallel to one another, with at least one of said computer-generated holograms being located between each pair of adjacent substrates in said stack.

\* \* \* \* \*